United States Patent
Xu et al.

(10) Patent No.: US 10,601,077 B2
(45) Date of Patent: Mar. 24, 2020

(54) SELENIUM-DOPED SULFUR CATHODES FOR RECHARGEABLE BATTERIES

(71) Applicant: UChicago Argonne, LLC, Chicago, IL (US)

(72) Inventors: Gui-Liang Xu, Downers Grove, IL (US); Zonghai Chen, Bolingbrook, IL (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 280 days.

(21) Appl. No.: 15/280,867

(22) Filed: Sep. 29, 2016

(65) Prior Publication Data
US 2018/0090751 A1    Mar. 29, 2018

(51) Int. Cl.
H01M 10/0569    (2010.01)
H01M 4/38    (2006.01)
H01M 10/054    (2010.01)
H01M 4/62    (2006.01)
H01M 4/139    (2010.01)
H01M 4/13    (2010.01)
H01M 10/052    (2010.01)
H01M 4/02    (2006.01)

(52) U.S. Cl.
CPC ......... *H01M 10/0569* (2013.01); *H01M 4/13* (2013.01); *H01M 4/139* (2013.01); *H01M 4/38* (2013.01); *H01M 4/381* (2013.01); *H01M 4/382* (2013.01); *H01M 4/625* (2013.01); *H01M 10/052* (2013.01); *H01M 10/054* (2013.01); *H01M 4/624* (2013.01); *H01M 2004/028* (2013.01); *H01M 2300/0034* (2013.01)

(58) Field of Classification Search
None
See application file for complete search history.

(56) References Cited

U.S. PATENT DOCUMENTS

| 9,005,808 B2 | 4/2015 | Abouimrane et al. |
| 2013/0266847 A1* | 10/2013 | Noguchi ........... H01M 10/0525 429/163 |
| 2015/0064575 A1* | 3/2015 | He ................... H01M 10/0568 429/300 |
| 2016/0020491 A1 | 1/2016 | Dai et al. |

OTHER PUBLICATIONS

Abouimrane et al., "A New Class of Lithium and Sodium Rechargeable Batteries Based on Selenium and Selenium-Sulfur as a Positive Electrode," J. Am. Chem. Soc. (2012), 134, p. 4505-4508.

* cited by examiner

*Primary Examiner* — Wojciech Haske
(74) *Attorney, Agent, or Firm* — Foley & Lardner LLP

(57) ABSTRACT

An electrochemical device includes an anode, a separator, a cathode comprising a selenium-doped sulfur/carbon composite that includes a conductive carbon matrix and nano-sized selenium-doped sulfur particles of formula $S_xSe_y$, where a ratio of x:y is from 2.5 to 1000, and an electrolyte comprising a salt and a non-aqueous fluorinated ether solvent.

9 Claims, 15 Drawing Sheets

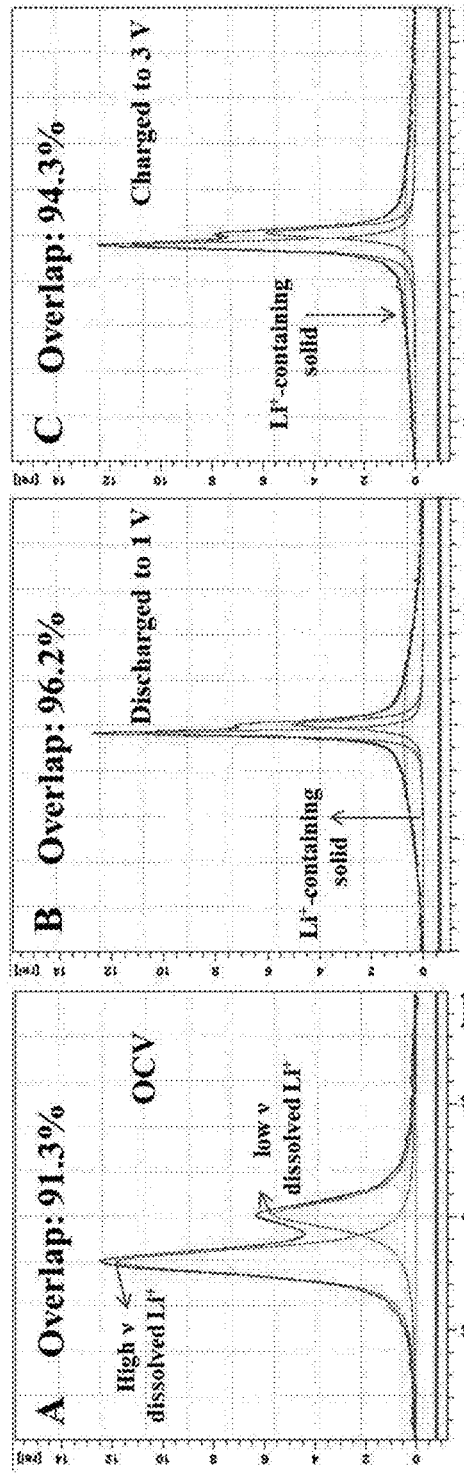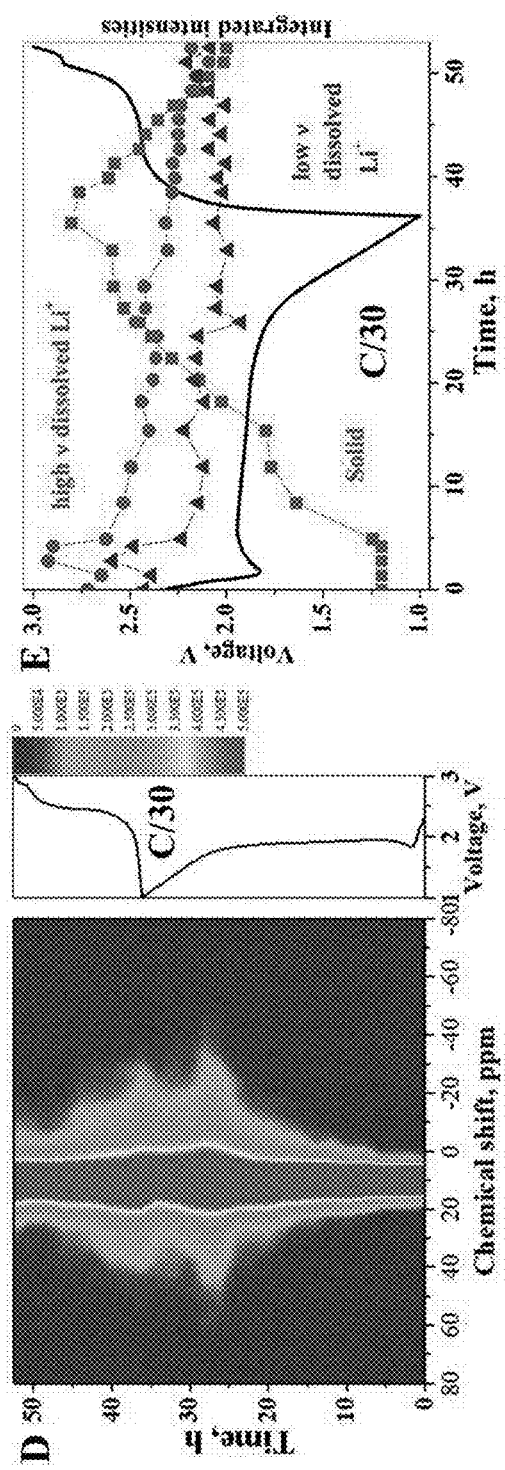
FIG. 5A  FIG. 5B  FIG. 5C  FIG. 5D  FIG. 5E

SELENIUM-DOPED SULFUR CATHODES FOR RECHARGEABLE BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to an electrochemical device comprising a metal anode, a separator, a cathode having a selenium-doped sulfur/carbon composite that includes a conductive carbon matrix and nano-sized selenium-doped sulfur particles, and an electrolyte that includes a non-aqueous fluorinated ether solvent.

BACKGROUND

Lithium/sulfur (Li/S) batteries have been under study in the past decades owing to their low cost, relative abundance of the constituent elements, and their non-toxicity, as well as the ability to exhibit a much higher energy density than conventional lithium ion batteries (2567 Wh/kg vs. 387 Wh/kg). Lithium/selenium (Li/Se) batteries have likewise attracted an increasing amount of attention in recent years due comparable volumetric capacity and higher electronic conductivity in relation to Li/S batteries.

It has been reported that the electrolytes play a significant role in the electrochemical performance of sulfur and selenium based cathodes. Among them, carbonate-based and ether-based electrolytes are two types of popular electrolytes for selenium-sulfur based cathodes. Selenium has been found to be well-adapted to carbonate-based electrolytes, while sulfur does not. The nucleophilic reaction between polysulfides and carbonate electrolytes would be a major concern.

It was reported that ether-based electrolytes could facilitate the redox reaction of sulfur-based cathodes and generally offer higher reversible capacity than that of carbonate-based electrolytes. It was found that Se is reduced to the polyselenides, $Li_2Se_n$ (n≥4), $Li_2Se_2$, and $Li_2Se$ sequentially during the lithiation process, and $Li_2Se$ is oxidized to Se through $Li_2Se_n$ (n≥4) during the de-lithiation process in the $1^{st}$ cycle, which undergoes similar reaction process to the sulfur system. However, even with a very good encapsulation of selenium or selenium-sulfur in the various carbon host materials, most of the previously reported Se-based cathodes show a gradual capacity fading in DOL-DME based electrolytes.

Our previous studies have revealed that the lithiation/de-lithiation reversibility of the selenium gradually decreased in DOL-DME based electrolytes, leading to an aggravated formation of long-chain polyselenides during cycling and further capacity decay. Moreover, Ab initio calculations revealed that the binding energy of polyselenides ($Li_2Se_n$) with carbon host is in an order of $Li_2Se_6 > Li_2Se_4 > Li_2Se$. While the binding of polysulfides with the host is in order of $Li_2S > Li_2S_4 > Li_2S_6$, leading to the distinctive electrochemical performance. Therefore, the development of a good combination of novel cathode materials and electrolytes is required.

SUMMARY

In one aspect, provided herein are rechargeable batteries including a metal anode, a porous separator, a non-aqueous electrolyte and a selenium-doped sulfur/carbon ($S_xSe_y$, where 2.5≤x/y≤1000) cathode including a conductive carbon matrix and nano-sized $S_xSe_y$ particles, wherein the nano-sized $S_xSe_y$ particles are uniformly dispersed on the surface of, or within pores of, the carbon matrix; and the carbon matrix includes one or more of graphite, graphene, expanded graphite, reduced graphene oxide, Black Pearls® 2000, Ketjenblack®, acetylene black, carbon black, a metal-organic framework, porous carbon, carbon spheres, carbon aerogel, single-walled carbon nanotubes, multi-walled carbon nanotubes, carbon nanofibers, carbon nanotube arrays, polypyrrole, and polyaniline. In some embodiments, the cathode includes one or more of a cathode active material, a current collector, a conductive carbon material, and a binder. The non-aqueous electrolytes include a fluorinated solvent and a lithium salt, a sodium salt, or a mixture of any two or more such salts. The fluorinated solvent may be of general formula $(C_mF_nH_{2m-n+2})_2O$, where m and n are integers. In some embodiments, m and n may individually be from 1 to 50, from 1 to 30, from 1 to 20, from 1 to 10, or from 3 to 10, or any ranges therebetween. Illustrative fluorinated solvents include, but are not limited to, 1,1,2,2-tetrafluoroethyl-2,2,3,3-tetrafluoropropyl ether ("FIFE"); 1,1,2,2-tetrafluoroethyl-2,2,3,3,3-pentafluoropropyl ether; 2,2,2-trisfluoroethyl-1,1,2,3,3,3-hexafluoropropyl ether; glycidyl 1,1,2,2-tetrafluoroethyl ether; glycidyl-2,2,3,3,4,4,5,5,6,6,7,7,8,8,9,9-hexadecafluorononyl ether; glycidyl-2,2,3,3,4,4,5,5-octafluoropentyl ether; (2,2,3,3,4,4,5,5,6,6,7,7,8,8,9,9,9-heptadecafluorononyl)oxirane; 1,1,1,3,3,3-hexafluoro-2-propyl ether; ethyl-1, 1,2,3,3,3-hexafluoropropyl ether; difluoromethyl-2,2,3,3,3-pentafluoropropyl ether; difluoromethyl-2,2,3,3-tetrafluoropropyl ether; 2-fluoro-1,3-dioxolane; 2,2-difluoro-1,3-dioxolane; 2-trifluoromethyl-1,3-dioxolane; 2,2-bis(trifluoromethyl)-1,3-dioxolane; 4-fluoro-1,3-dioxolane; 4,5-difluoro-1,3-dioxolane; methylnanofluorobutyl ether; 1,1,2,3,3,3-hexafluoropropylmethyl ether; 1,1,1,2,2,3,3,4,4-nonafluoro-6-propoxyhexane; fluorinated 1,5-diarylpyrrole-3-alkoxyethyl ether; a fluorine-containing vinyl ether compound; a fluorinated bisphenol ether compound; or a mixture of any two or more such solvents. In some embodiments, the fluorinated solvent is HFE. A non-fluorinated co-solvent may also be used. In some embodiments, the non-fluorinated co-solvent may include, but is not limited to, 1,3-dioxolane ("DOL"), dimethoxyethane ("DME"), di(ethylene glycol) dimethyl ether, tri(ethylene glycol) dimethyl ether, tetra(elene glycol) dimethyl ether ("TEGDME"), 1,4-dioxane, dimethyl sulfoxide, tetrahydrofuran, ethylene carbonate, dimethyl carbonate, ethyl methyl carbonate, oligo(ethylene glycol)-substituted siloxanes, oligo(ethylene glycol)-substituted silanes, and ionic liquids. In some embodiments, the non-fluorinated solvent is DOL.

In another aspect, provided herein are cathodes including a $S_xSe_y$/carbon (where 2.5≤x/y≤1000) composite containing a conductive carbon matrix and nano-sized $S_xSe_y$ particles, wherein the nano-sized $S_xSe_y$ particles are uniformly dispersed on the surface of the carbon matrix or within the pores of porous carbon; and the carbon matrix includes one or more of graphite, graphene, expanded graphite, reduced graphene oxide, Black Pearls® 2000, Ketjenblack®, acetylene black, carbon black, a metal-organic framework, porous carbon, carbon spheres, carbon aerogel, single-walled carbon nanotubes, multi-walled carbon nanotubes, carbon nanofibers, carbon nanotube arrays, polypyrrole, and polyaniline. In some embodiments, the cathode further includes a current collector, a conductive agent, a binder, or any combination thereof.

In another aspect, provided herein are $S_xSe_y$/carbon composites (where $2.5 \leq x/y \leq 1000$) including a conductive carbon matrix and nano-sized $S_xSe_y$ particles, wherein the nano-sized $S_xSe_y$ particles are uniformly dispersed on the surface of, or within the pores of, the carbon matrix or pores of porous carbon; the carbon matrix includes one or more of graphite, graphene, expanded graphite, reduced graphene oxide, Black Pearls® 2000, Ketjenblack®, acetylene black, carbon black, a metal-organic framework, porous carbon, carbon spheres, carbon aerogel, single-walled carbon nanotubes, multi-walled carbon nanotubes, carbon nanofibers, carbon nanotube arrays, polypyrrole, and polyaniline. In some embodiments, the nano-sized $S_xSe_y$ particles have a particle size of about 0.1 nm to about 200 nm. In some embodiments, the $S_xSe_y$/carbon composite has a carbon matrix content of about 0.1% to about 80% by weight of the composite. In some embodiments, the $S_xSe_y$/carbon composite has a $S_xSe_y$ content of about 20% to about 99.9% by weight of the composite.

In another aspect, provided herein are methods to prepare the $S_xSe_y$/carbon composites described herein. The methods include ball milling a mixture of one or more precursors for the conductive carbon matrix, sulfur, and selenium followed by high temperature treatment. In some embodiments, the high temperature treatment process may be performed from 200° C. to 300° C. for 1 to 24 h.

BRIEF DESCRIPTION OF THE DRAWINGS

FIGS. 5A, 5B and 5C depicts in operando $^7$Li NMR studies on the $S_xSe_y$/carbon cathode according to Example 6; fit curves to the NMR line shape at open circuit voltage, after being discharged to 1.0 V, and charged back to 3.0 V, respectively; while a 2D contour plot of NMR signal verse charge/discharge curve is shown in FIG. 5D; and integrated areas for different phases as a function of the charge/discharge process is shown in FIG. 5E.

DETAILED DESCRIPTION

Figure 1A:
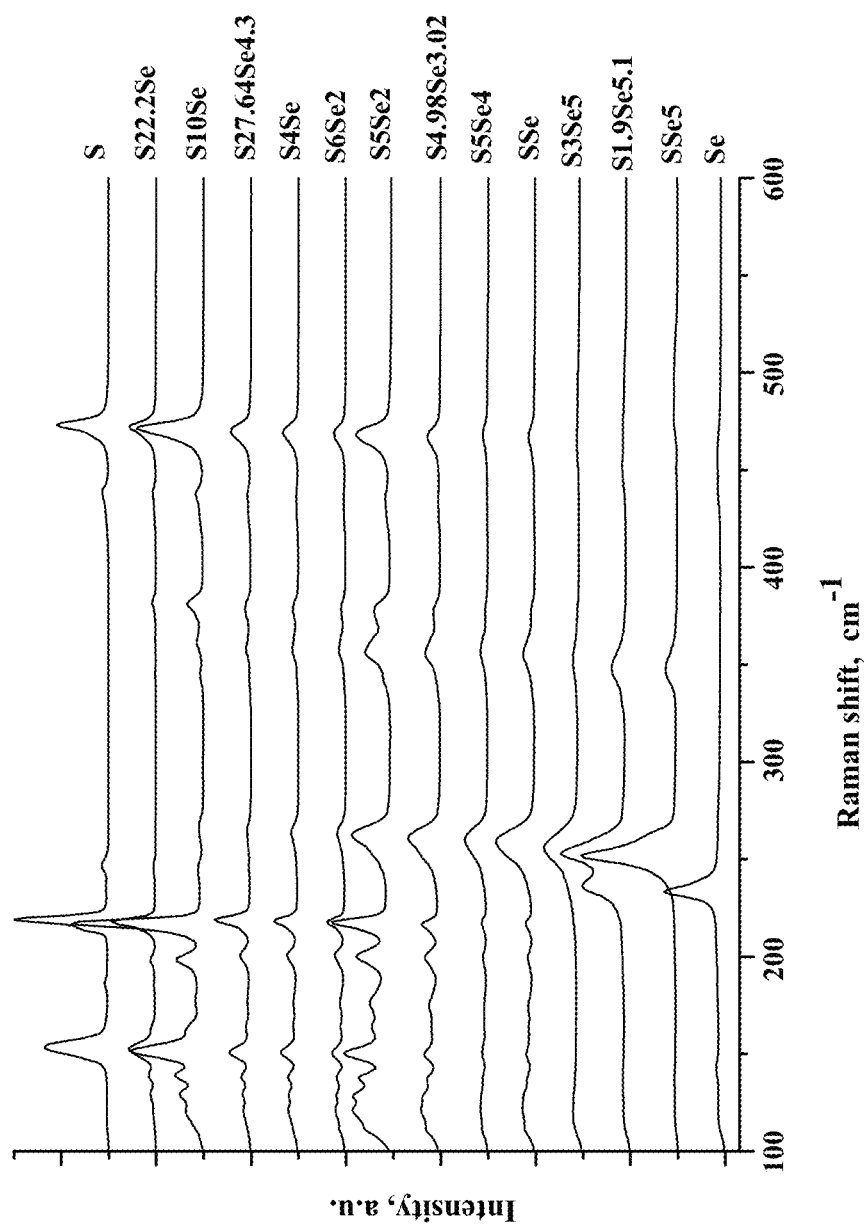
FIG. 1A is a Raman spectra.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar references in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Provided herein, are $S_xSe_y$/carbon composites that include a conductive carbon matrix and nano-sized $S_xSe_y$ particles. In the composites, the ratio of x:y is from 2.5 to 1000, inclusive. Additionally, in the composites, the nano-sized $S_xSe_y$ particles may be uniformly dispersed on the surface of, or within pores of, the carbon matrix. Alternatively, where the carbon matrix is a porous carbon matrix, nano-sized $S_xSe_y$ particles may be uniformly dispersed within the pores of the porous carbon matrix. Without being bound to theory, the uniform dispersion or pore-confinement of the nano-sized $S_xSe_y$ particles in the conductive carbon matrix during high energy ball milling process may prevent the dissolution of polyselenides and polysulfides, and thereby accommodate the volume changes during repeated charge/discharge cycles.

The conductive carbon matrix may include, but is not limited to, graphite, graphene, expanded graphite, reduced graphene oxide, Black Pearls® 2000, Ketjenblack®, acetylene black, carbon black, metal-organic framework (e.g., a porous, ordered organic-inorganic composite material), porous carbon, carbon spheres, carbon aerogel, single-walled carbon nanotubes, multi-walled carbon nanotubes, carbon nanofibers, carbon nanotube arrays, polypyrrole, polyaniline, and mixtures of any two or more such materials. Black Pearls® 2000 and Ketjenblack® are commercially available forms of carbon black. In some embodiments, the conductive carbon matrix includes a mixture of any one or more of graphite, graphene, expanded graphite, reduced graphene oxide, Black Pearls® 2000, Ketjenblack®, acetylene black, carbon black, metal-organic framework (e.g., a porous, ordered organic-inorganic composite material), porous carbon, carbon spheres, carbon aerogel, single-walled carbon nanotubes, multi-walled carbon nanotubes, carbon nanofibers, carbon nanotube arrays, polypyrrole, and polyaniline.

The conductive carbon matrix may have a high specific surface area to support the nano-sized $S_xSe_y$ particles. Without being bound to theory, the high surface area of the conductive carbon matrix enables a uniform dispersion of nano-sized $S_xSe_y$ particles in the $S_xSe_y$/carbon composite. The high specific surface area may be about 100 to about 2600 $m^2 g^{-1}$. This includes a high specific surface area of about 200 to about 2600 $m^2 g^{-1}$, about 400 to about 2600 $m^2 g^{-1}$, about 600 to about 2600 $m^2 g^{-1}$, about 800 to about 2600 $m^2 g^{-1}$, about 1000 to about 2600 $m^2 g^{-1}$, about 1200 to about 2600 $m^2 g^{-1}$, about 1400 to about 2600 $m^2 g^{-1}$, about 1600 to about 2600 $m^2 g^{-1}$, about 1800 to about 2600 $m^2 g^{-1}$, about 2000 to about 2600 $m^2 g^{-1}$, or about 2200 to about 2600 $m^2 g^{-1}$. In some embodiments, the high specific surface area is about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, or 2600 $m^2 g^{-1}$.

The nano-sized $S_xSe_y$/carbon particles may have a particle size of about 0.1 nm to about 200 nm. This includes nano-sized $S_xSe_y$ particles having a particle size of about 5 nm to about 200 nm, about 10 nm to about 200 nm, about 20 nm to about 200 nm, about 30 nm to about 200 nm, about 40 nm to about 200 nm, about 50 nm to about 200 nm, about 60 nm to about 200 nm, about 70 nm to about 200 nm, about 80 nm to about 200 nm, about 90 nm to about 200 nm, or about 100 nm to about 200 nm. In some embodiments, the nano-sized $S_xSe_y$ particles have a particle size of about 1 nm to about 150 nm. This includes nano-sized $S_xSe_y$ particles having a particle size of about 5 nm to about 150 nm, about 10 nm to about 150 nm, about 20 nm to about 150 nm, about 30 nm to about 150 nm, about 40 nm to about 150 nm, about 50 nm to about 150 nm, about 60 nm to about 150 nm, about 70 nm to about 150 nm, about 80 nm to about 150 nm, about 90 nm to about 150 nm, or about 100 nm to about 150 nm. In some embodiments, the nano-sized $S_xSe_y$ particles have a particle size of about 1 nm to about 100 nm. This includes nano-sized SxSey particles having a particle size of about 5 nm to about 100 nm, about 10 nm to about 100 nm, about 20 nm to about 100 nm, about 30 nm to about 100 nm, about 40 nm to about 100 nm, about 50 nm to about 100 nm, about 60 nm to about 100 nm, about 70 nm to about 100 nm, about 80 nm to about 100 nm, or about 90 nm to about 100 nm. In some embodiments, the nano-sized $S_xSe_y$ particles have a particle size of about 1 nm to about 50 nm. This includes nano-sized $S_xSe_y$ particles having a particle size of about 5 nm to about 50 nm, about 10 nm to about 50 nm, about 20 nm to about 50 nm, about 30 nm to about 50 nm, or about 40 nm to about 50 nm. In some embodiments, the nano-sized $S_xSe_y$ particles have a particle size of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm, including increments therein.

The $S_xSe_y$/carbon composite may have a carbon matrix content of about 0.01% to about 80% by weight of the composite. This includes a carbon matrix content of about 5% to about 80%, about 10% to about 80%, about 15% to about 80%, about 20% to about 80%, about 25% to about 80%, about 30% to about 80%, about 35% to about 80%, about 40% to about 80%, about 45% to about 80%, about 50% to about 80%, about 55% to about 80%, or about 60% to about 80% by weight of the composite. In some embodiments, the $S_xSe_y$/carbon composite has a carbon matrix content of about 0.01% to about 60% by weight of the composite. This includes a carbon matrix content of about 5% to about 60%, about 10% to about 60%, about 15% to about 60%, about 20% to about 60%, about 25% to about 60%, about 30% to about 60%, about 35% to about 60%, about 40% to about 60%, about 45% to about 60%, or about 50% to about 60% by weight of the composite. In some embodiments, the $S_xSe_y$/carbon composite has a carbon matrix content of about 1% to about 50% by weight of the composite. This includes a carbon matrix content of about 5% to about 50%, about 10% to about 50%, about 15% to about 50%, about 20% to about 50%, about 25% to about 50%, about 30% to about 50%, about 35% to about 50%, about 40% to about 50%, or about 45% to about 50% by weight of the composite. In some embodiments, the $S_xSe_y$/carbon composite has a carbon matrix content of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, or 80%, including increments therein, by weight of the composite.

The $S_xSe_y$/carbon composite may have a $S_xSe_y$ content of about 20.0% to about 99.9% by weight of the composite, provided that the total content of carbon matrix and $S_xSe_y$ are 100%. This includes a $S_xSe_y$ content of about 21% to about 99.9%, about 25% to about 99.9%, about 30% to about 99.9%, about 40% to about 99.9%, about 50% to about 99.9%, about 60% to about 99.9%, about 70% to about 99.9%, about 80% to about 99.9%, or about 90% to about 99.9% by weight of the composite. In some embodiments, the $S_xSe_y$/carbon composite has a $S_xSe_y$ content of about 20.0% to about 90% by weight of the composite. This includes a $S_xSe_y$ content of about 21% to about 90%, about 25% to about 90%, about 30% to about 90%, about 40% to about 90%, about 50% to about 90%, about 60% to about 90%, about 70% to about 90%, about 80% to about 90% by weight of the composite. In some embodiments, the $S_xSe_y$/carbon composite has a $S_xSe_y$ content of about 20.0% to about 80% by weight of the composite. This includes a $S_xSe_y$ content of about 21% to about 80%, about 25% to about 80%, about 30% to about 80%, about 40% to about 80%, about 50% to about 80%, about 60% to about 80%, about 70% to about 80% by weight of the composite. In some embodiments, the $S_xSe_y$/carbon composite has a $S_xSe_y$ content of about 20.0% to about 70% by weight of the composite. This includes a $S_xSe_y$ content of about 21% to about 70%, about 25% to about 70%, about 30% to about 70%, about 40% to about 70%, about 50% to about 70%, about 60% to about 70% by weight of the composite. In some embodiments, the $S_xSe_y$/carbon composite has a $S_xSe_y$ content of about 20, 25, 30, 35, 40, 45, 50, 55, 60, 65, 70, 75, 80, 85, 90, 95, 99, or 99.9%, including increments therein, by weight of the composite.

The atomic weight ratio (x/y) of S in the $S_xSe_y$ may be from 2.5 to 1000. This includes a Se content of about 0.1% to about 49.4%, about 1% to about 49.4%, about 5% to about 49.4%, about 10% to about 49.4%, about 15% to about 49.4%, about 20% to about 49.4%, about 25% to about 49.4%, about 30% to about 49.4%, about 35% to about 49.4%, about 40% to about 49.4%, or about 45% to about 49.4% by weight of the Se. In embodiments, the $S_xSe_y$ composite in the $S_xSe_y$/carbon composite has a Se content of about 0.1% to about 40% by weight of Se. This includes a Se content of about 0.5% to about 40%, about 1% to about 40%, about 5% to about 40%, about 10% to about 40%, about 15% to about 40%, about 20% to about 40%, about 25% to about 40%, about 30% to about 40%, or about 35% to about 40% by weight of Se. In some embodiments, the $S_xSe_y$ in the $S_xSe_y$/carbon composite has a Se content of about 0.1% to about 30% by the weight of the composite. This includes a Se content of about 0.1% to about 30%, about 1% to about 30%, about 5% to about 30%, about 10% to about 30%, about 15% to about 30%, about 20% to about 30%, or about 25% to about 30% by weight of the Se. In some embodiments, the $S_xSe_y$ in the $S_xSe_y$/carbon composite has a Se content of about 0.1% to about 20% by the weight of the composite. This includes a Se content of about 0.1% to about 20%, about 1% to about 20%, about 2% to about 20%, about 3% to about 20%, about 4% to about 20%, about 5% to about 20%, about 6% to about 20%, about 7% to about 20%, about 8% to about 20%, about 9% to about 20%, about 10% to about 20%, about 11% to about 20%, about 12% to about 20%, about 13% to about 20%, about 14% to about 20%, about 15% to about 20%, about 16% to about 20%, about 17% to about 20%, about 18% to about 20%, or about 19% to about 20% by the weight of the Se. In some embodiments, the $S_xSe_y$ in the $S_xSe_y$/carbon composite has a Se content of about 0.1% to about 10% by the weight of the composite. This includes a Se content of about 0.1% to about 10%, about 1% to about 10%, about 2% to about 10%, about 3% to about 10%, about 4% to about 10%, about 5% to about 10%, about 6% to about 10%, about 7% to about 10%, about 8% to about 10%, or about 9% to about 10% by the weight of the Se. In some embodiments, the $S_xSe_y$ in the $S_xSe_y$/carbon composite has a Se content of about 0.1, 0.5, 1, 2, 3, 4, 5, 6, 7, 8, 9, 10, 11, 12, 13, 14, 15, 16, 17, 18, 19, 20, 25, 30, 35, 40, 45, or 49.4%, including increments therein, by the weight of the Se. In some embodiments, the x/y value is ranging from about ⅕ to about 25, about 1 to 25, about 2 to 25, about 4 to 25, about 10 to 25, about 15 to 25, or about 20 to 25.

In another aspect, provided herein are methods to prepare a $S_xSe_y$/carbon composite disclosed herein. The method may include ball milling a mixture containing one or more precursors for the conductive carbon matrix, sulfur powder and selenium powder followed by high temperature treatment and a cooling process. The one or more precursors for the conductive carbon matrix may include graphite, graphene, expanded graphite, reduced graphene oxide, Black Pearls® 2000, Ketjenblack®, acetylene black, carbon black, a metal-organic framework, porous carbon, carbon spheres, carbon aerogel, single-walled carbon nanotubes, multi-walled carbon nanotubes, carbon nanofibers, carbon nanotube arrays, polypyrrole, polyaniline, or a combination of any two or more thereof.

The ball milling may be performed at a rotation speed of about 50 to about 1500 rpm. This includes a rotation speed of about 100 to about 1500 rpm, about 200 to about 1500 rpm, about 300 to about 1500 rpm, about 400 to about 1500 rpm, about 500 to about 1500 rpm, about 600 to about 1500 rpm, about 700 to about 1500 rpm, about 800 to about 1500 rpm, about 900 to about 1500 rpm, about 1000 to about 1500 rpm, about 1100 to about 1500 rpm, about 1200 to about 1500 rpm, about 1300 to about 1500 rpm, or about 1400 to about 1500 rpm. In some embodiments, the rotation speed is about 100, 200, 300, 400, 500, 600, 700, 800, 900, 1000, 1100, 1200, 1300, 1400, or 1500, including increments therein, rpm.

The ball milling may be performed for a time period of about 1 to about 30 hours. This includes a time period of about 2 to about 30 hours, about 3 to about 30 hours, about 4 to about 30 hours, about 5 to about 30 hours, about 6 to about 30 hours, about 7 to about 30 hours, about 8 to about 30 hours, about 9 to about 30 hours, about 10 to about 30 hours, about 11 to about 30 hours, about 12 to about 30 hours, about 15 to about 30 hours, about 20 to about 30 hours, or about 25 to about 30 hours. In some embodiments, the ball milling is performed for a time period of about 1 to about 15 hours. This includes a time period of about 2 to about 15 hours, about 3 to about 15 hours, about 4 to about 15 hours, about 5 to about 15 hours, about 6 to about 15 hours, about 7 to about 15 hours, about 8 to about 15 hours, about 9 to about 15 hours, or about 10 to about 15 hours.

The ball milling may be conducted in a variety of containers. An illustrative container is an agate container having agate balls, or a zirconium container containing zirconium balls, under inert atmosphere (e.g., argon gas), and at a rotation speed of about 300-1500 rpm for about 1 to 15 hours.

The high temperature treatment process may be performed at a temperature of about 100 to about 600° C. This includes a temperature range of about 110 to about 600° C., about 120 to about 600° C., about 130 to about 600° C., about 140 to about 600° C., about 150 to about 600° C., about 160 to about 600° C., about 170 to about 600° C., about 180 to about 600° C., about 190 to about 600° C., about 200 to about 600° C., about 220 to about 600° C., about 240 to about 600° C., about 260 to about 600° C., about 280 to about 600° C., about 300 to about 600° C., about 350 to about 600° C., about 400 to about 600° C., about 450 to about 600° C., about 500 to about 600° C., or about 550 to about 600° C. In some embodiments, the process may be performed at a temperature of about 100 to about 260° C. This includes a temperature range of about 110 to about 260° C., about 120 to about 260° C., about 130 to about 260° C., about 140 to about 260° C., 150 to about 260° C., 160 to about 260° C., 170 to about 260° C., 180 to about 260° C., 190 to about 260° C., 200 to about 260° C., 210 to about 260° C., 220 to about 260° C., 230 to about 260° C., 240 to about 260° C., or 250 to about 260° C.

The high temperature treatment process may be performed for a time period of about 1 to about 24 hours. This includes a time period of about 2 to about 24 hours, about 3 to about 24 hours, about 4 to about 24 hours, about 5 to about 24 hours, about 6 to about 24 hours, about 7 to about 24 hours, about 8 to about 24 hours, about 9 to about 24 hours, about 10 to about 24 hours, about 11 to about 24 hours, about 12 to about 24 hours, about 13 to about 24 hours, about 14 to about 24 hours, about 15 to about 24 hours, about 16 to about 24 hours, about 18 to about 24 hours, about 20 to about 24 hours, or about 22 to about 24 hours. In some embodiments, the high temperature treatment is performed for a time period of about 15 to about 24 hours. This includes a time period of about 16 to about 24 hours, about 17 to about 24 hours, about 18 to about 24 hours, about 19 to about 24 hours, about 20 to about 24 hours, about 21 to about 24 hours, about 22 to about 24 hours, or about 23 to about 24 hours.

The cooling process may be performed at a cooling rate from 0.1° C. min$^{-1}$ to 30° C. min$^{-1}$. This includes a cooling rate of about 0.2 to 30° C. min$^{-1}$, about 0.5 to 30° C. min$^{-1}$, about 1 to 30° C. min$^{-1}$, about 2 to 30° C. min$^{-1}$, about 3 to 30° C. min$^{-1}$, about 4 to 30° C. min$^{-1}$, about 5 to 30° C. min$^{-1}$, about 6 to 30° C. min$^{-1}$, about 7 to 30° C. min$^{-1}$, about 8 to 30° C. min$^{-1}$, about 9 to 30° C. min$^{-1}$, about 10 to 30° C. min$^{-1}$, about 15 to 30° C. min$^{-1}$, about 20 to 30° C. min$^{-1}$, or about 25 to 30° C. min$^{-1}$. The cooling process may be performed at a cooling rate ranging from 20° C. min$^{-1}$ to 30° C. min$^{-1}$. This includes a cooling rate of about 21 to 30° C. min$^{-1}$, about 22 to 30° C. min$^{-1}$, about 23 to 30° C. min$^{-1}$, about 24 to 30° C. min$^{-1}$, about 25 to 30° C. min$^{-1}$, about 26 to 30° C. min$^{-1}$, about 27 to 30° C. min$^{-1}$, about 28 to 30° C. min$^{-1}$, or about 29 to 30° C. min$^{-1}$. The cooling process may be performed at a cooling rate ranging from 0.1° C. min$^{-1}$ to 3° C. min$^{-1}$. This includes a cooling rate of about 0.2 to 3° C. min$^{-1}$, about 0.3 to 3° C. min$^{-1}$, about 0.4 to 3° C. min$^{-1}$, about 0.5 to 3° C. min$^{-1}$, about 0.6 to 3° C. min$^{-1}$, about 0.7 to 3° C. min$^{-1}$, about 0.8 to 3° C. min$^{-1}$, about 0.9 to 3° C. min$^{-1}$, about 1.0 to 3° C. min$^{-1}$, about 1.2 to 3° C. min$^{-1}$, about 1.4 to 3° C. min$^{-1}$, about 1.6 to 3° C. min$^{-1}$, about 1.8 to 3° C. min$^{-1}$, about 2.0 to 3° C. min$^{-1}$, about 2.2 to 3° C. min$^{-1}$, about 2.4 to 3° C. min$^{-1}$, about 2.6 to 3° C. min$^{-1}$, or about 2.8 to 3° C. min$^{-1}$.

In another aspect, disclosed herein are electroactive materials including a $S_xSe_y$/carbon composite as described.

In another aspect, disclosed herein are cathodes including a $S_xSe_y$/carbon composite disclosed herein. In some embodiments, the cathode includes a $S_xSe_y$/carbon composite including a conductive carbon matrix and nano-sized $S_xSe_y$ particles, wherein the nano-sized $S_xSe_y$ particles are uniformly dispersed on the surface of, or within pores of, the carbon matrix.

The cathode may further include one or more of a current collector, a conductive carbon material, and a binder.

In another aspect, disclosed herein are lithium batteries including a cathode containing a $S_xSe_y$/carbon composite disclosed herein, wherein the nano-sized $S_xSe_y$ particles are uniformly dispersed on the surface of, or within pores of, the carbon matrix.

In another aspect, disclosed herein are sodium batteries including a cathode containing a $S_xSe_y$/carbon composite disclosed herein, wherein the nano-sized $S_xSe_y$ particles are uniformly dispersed on the surface of, or within pores of, the carbon matrix.

Illustrative conductive carbon materials include, but are not limited to, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, Ketjenblack®, and mixtures of any two or more thereof.

The current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the $S_xSe_y$/carbon composite disclosed herein and one or more of a conductive carbon material and a binder are contacted with the current collector by casting, pressing, or rolling the mixture thereto.

When used, the binder may be present in the electrode in an amount of from about 0.1 wt % to about 99 wt %. In some embodiments, the binder is present in the electrode in an amount of from about 2 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

Illustrative separators include, but are not limited to, Celgard 2325, Celgard 2400, Celgard 3501, and glass fiber.

In some embodiments, the electrolyte is a lithium salt and a solvent. The lithium salt may be $LiClO_4$, $LiPF_6$, $LiAsF_6$, $LiBF_4$, $LiB(C_2O_4)_2$ ("LiBOB"), $LiBF_2(C_2O_4)$ ("LiODFB"), $LiCF_3SO_3$, $LiN(SO_2F)_2$ ("LiFSI"), $LiPF_3(C_2F_5)_3$ ("LiFAP"), $LiPF_4(CF_3)_2$, $LiPF_3(CF_3)_3$, or $LiN(SO_2CF_3)$, or any combination thereof. The salt may be present in the electrolyte at a concentration of about 0.01 M to about 10.0 M. This includes a concentration of about 0.01 M to about 9.5 M, about 0.01 M to about 8.0 M, about 0.01 M to about 7.5 M, about 0.01 M to about 7.0 M, about 0.01 M to about 6.5 M, about 0.01 M to about 6.0 M, about 0.01 M to about 5.5 M, about 0.01 M to about 5.0 M, about 0.01 M to about 4.5 M, about 0.01 M to about 4.0 M, about 0.01 M to about 3.5 M, about 0.01 M to about 3.0 M, about 0.01 M to about 2.5 M, about 0.01 M to about 2.0 M, about 0.01 M to about 2.0 M, about 0.01 M to about 1.5 M, about 0.01 M to about 1.0 M, about 0.01 M to about 0.5 M, or about 0.01 M to about 0.1 M. In some embodiments, the salt is present in the electrolyte at a concentration of about 0.5 M to about 10.0 M. This includes a concentration of about 0.5 M to about 9.5 M, about 0.5 M to about 9.0 M, about 0.5 M to about 8.5 M, about 0.5 M to about 8.0 M, about 0.5 M to about 7.5 M, about 0.5 M to about 7.0 M, about 0.5 M to about 6.5 M, about 0.5 M to about 6.0 M, about 0.5 M to about 5.5 M, about 0.5 M to about 5.0 M, about 0.5 M to about 4.5 M, about 0.5 M to about 4.0 M, about 0.5 M to about 3.5 M, about 0.5 M to about 3.0 M, about 0.5 M to about 2.5 M, about 0.5 M to about 2.0 M, about 0.5 M to about 1.5 M, or about 0.5 M to about 1.0 M. In some embodiments, the salt is present in the electrolyte at a concentration of about 0.01, 0.05, 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 or 10.0, including increments therein.

In some embodiments, the electrolyte is a sodium salt and a solvent. The sodium salt may be $NaClO_4$, $NaPF_6$, $NaAsF_6$, $NaBF_4$, $NaCF_3SO_3$, $NaN(SO_2CF_3)_2$, or a combination of any two or more thereof. The salt may be present in the electrolyte at a concentration of about 0.01 M to about 10.0 M. This includes a concentration of about 0.01 M to about 9.5 M, about 0.01 M to about 8.0 M, about 0.01 M to about 7.5 M, about 0.01 M to about 7.0 M, about 0.01 M to about 6.5 M, about 0.01 M to about 6.0 M, about 0.01 M to about 5.5 M, about 0.01 M to about 5.0 M, about 0.01 M to about 4.5 M, about 0.01 M to about 4.0 M, about 0.01 M to about 3.5 M, about 0.01 M to about 3.0 M, about 0.01 M to about 2.5 M, about 0.01 M to about 2.0 M, about 0.01 M to about 2.0 M, about 0.01 M to about 1.5 M, about 0.01 M to about 1.0 M, about 0.01 M to about 0.5 M, or about 0.01 M to about 0.1 M. In some embodiments, the salt is present in the electrolyte at a concentration of about 0.5 M to about 10.0 M. This includes a concentration of about 0.5 M to about 9.5 M, about 0.5 M to about 9.0 M, about 0.5 M to about 8.5 M, about 0.5 M to about 8.0 M, about 0.5 M to about 7.5 M, about 0.5 M to about 7.0 M, about 0.5 M to about 6.5 M, about 0.5 M to about 6.0 M, about 0.5 M to about 5.5 M, about 0.5 M to about 5.0 M, about 0.5 M to about 4.5 M, about 0.5 M to about 4.0 M, about 0.5 M to about 3.5 M, about 0.5 M to about 3.0 M, about 0.5 M to about 2.5 M, about 0.5 M to about 2.0 M, about 0.5 M to about 1.5 M, or about 0.5 M to about 1.0 M. In some embodiments, the salt is present in the electrolyte at a concentration of about 0.01, 0.05, 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 or 10.0, including increments therein.

In some embodiments, the electrolytes include a non-aqueous fluorinated solvent and a non-fluorinated co-solvent. In the electrochemical cells where both the non-aqueous fluorinated ether solvent and a non-fluorinated solvent are present, a volume ratio of the two (or mixtures of either thereof) may be optimized to support battery function. For example, the ratio may range from about 1/9 to about 9/1. In any of the above embodiments, the volume ratio may be from about 3/7 to about 7/3. In yet other embodiments, the volume ratio may be about 1/1.

In some embodiments, the fluorinated solvents have a general formula of $(C_mF_nH_{2m-n+2})_2O$, where m and n are integers. In some embodiments, m and n may individually range from 1 to 100, from 1 to 50, from 1 to 30, from 1 to 10, or from 3 to 25. Illustrative non-aqueous fluorinated ether solvents include, but are not limited to, 1,1,2,2-tetra-fluoroethyl-2,2,3,3-tetrafluoropropyl ether (HFE); 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; difluoromethyl-2,2,3,3-tetrafluoropropyl ether; 2-fluoro-1,3-dioxolane; 2,2-difluoro-1,3-dioxolane; 2-trifluoromethyl-1,3-dioxolane; 2,2-bis(trifluoromethyl)-1,3-dioxolane; 4-fluoro-1,3-dioxolane; 4,5-difluoro-1,3-dioxolane, or a mixture of any two or more such non-aqueous fluorinated ether solvents. In some embodiments, the non-aqueous fluorinated solvent is HFE.

Illustrative non-fluorinated co-solvents include, but are not limited to, 1,3-dioxolane ("DOL"), dimethoxyethane ("DME"), di(ethylene glycol) dimethyl ether, tri(ethylene glycol) dimethyl ether, tetra(elene glycol) dimethyl ether ("TEGDME"), 1,4-dioxane, dimethyl sulfoxide, tetrahydrofuran, ethylene carbonate, dimethyl carbonate, ethyl methyl carbonate, oligo(ethylene glycol)-substituted siloxanes, oligo(ethylene glycol)-substituted silanes, and ionic liquids. In some embodiments, the non-fluorinated solvent is DOL.

The electrolytes may also contain an additive that further enhances the formation of a solid electrolyte interface ("SEI"). For example, such an additive may be $LiNO_3$, LiBr, LiI, LiBOB, LiDFOB, or LiTFOP. The additive may be present in the electrolyte at a concentration of from about 0.1 M to about 0.5 M. In some embodiments, the $LiNO_3$, LiBr, LiI, LiBOB, LiDFOB, or LiFTOP are present in the electrolyte at a concentration of about 0.1 M.

The present invention, thus generally described, will be understood more readily by reference to the following examples, which are provided by way of illustration and are not intended to be limiting of the present invention.

EXAMPLES

Example 1. Preparation of $S_xSe_y$/Carbon Composites and $S_xSe_y$ Materials

For the synthesis of $S_xSe_y$/carbon composites, sulfur powder, selenium powder and carbon matrix were mixed in specific weight ratios in a glove box (argon filled) and then transferred to a high energy ball milling machine and ball milled at 1425 rpm for 700 minutes. The weight ratio of the balls and the mixture was maintained in a ratio of 10. After that, the collected powder was moved to a sealed stainless steel reactor and calcined at 260° C. for 24 h. For the synthesis of bulk $S_xSe_y$ materials, the procedure is similar to that for $S_xSe_y$/carbon composites except without the addition of carbon matrix.

Figure 1B:
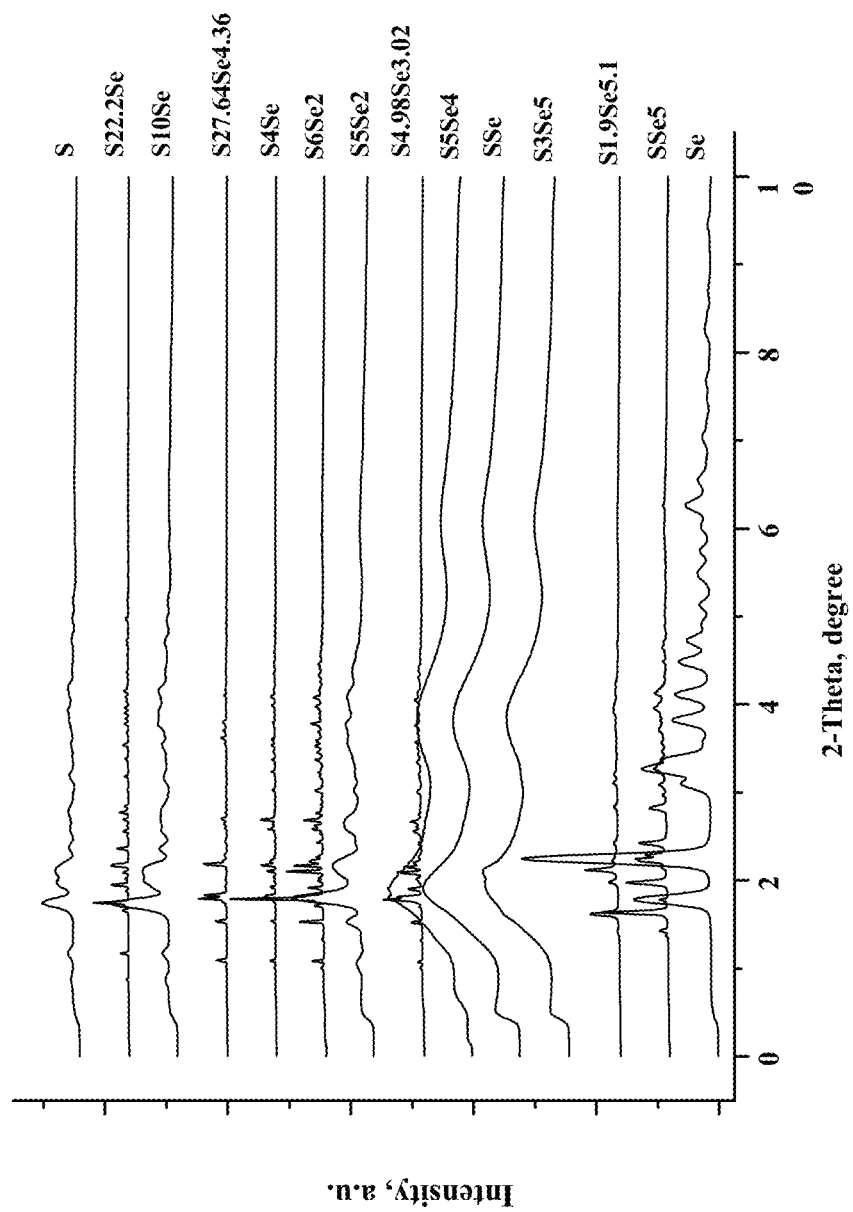
FIG. 1B is an X-ray diffraction pattern.
Figure 1C:
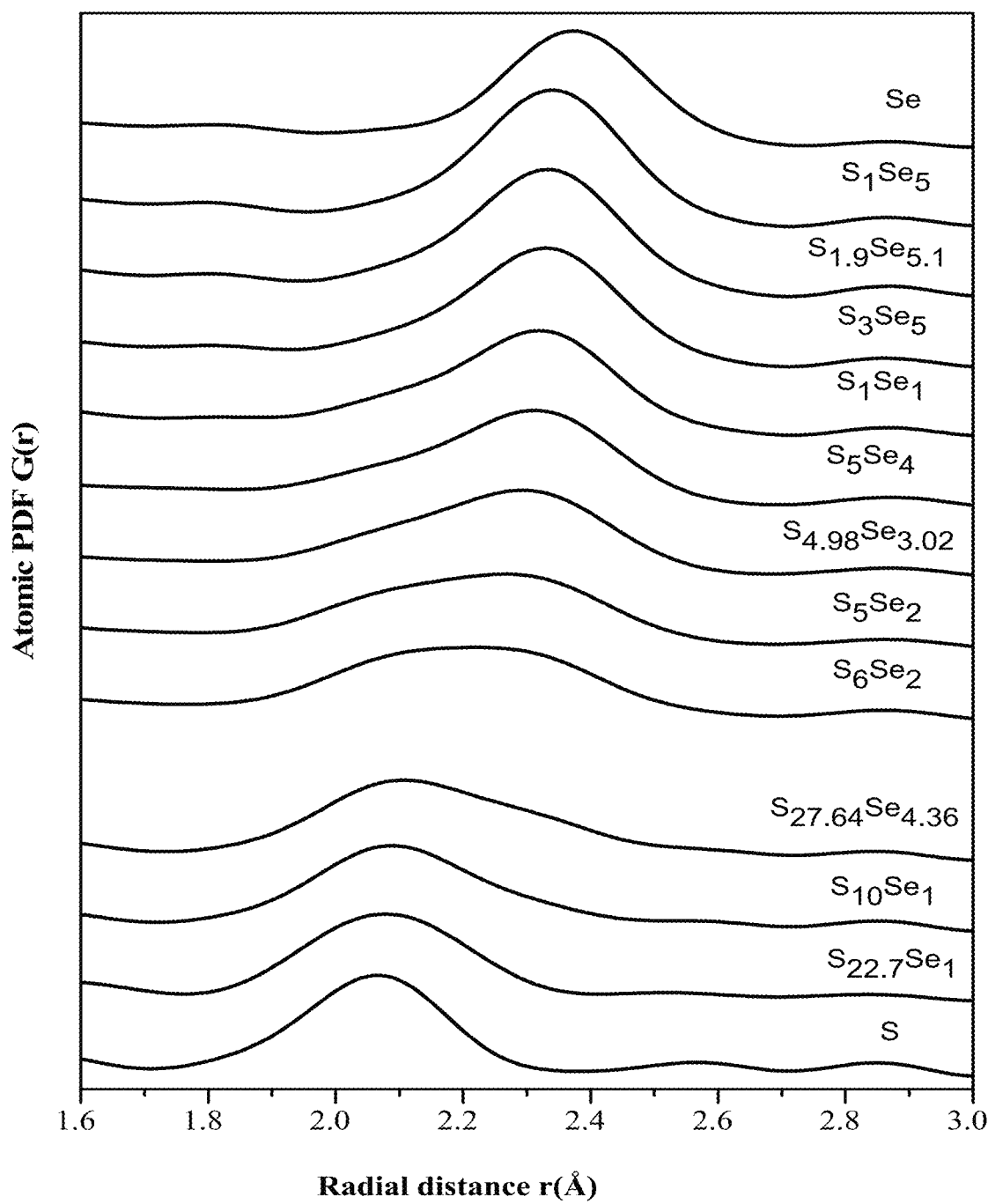
FIG. 1C is a pair distribution function for $S_xSe_y$ materials, according to various embodiments.

Example 2. X-Ray Diffraction Patterns, Raman Spectra and Pair Distribution Function Analysis of Bulk $S_xSe_y$ Materials A series of $S_xSe_y$ materials was prepared according to the method of Example 1. FIG. 1A and FIG. 1B illustrate the X-ray diffraction (XRD) and Raman spectra of different $S_xSe_y$ samples, respectively. As will be observed, the $S_xSe_y$ materials are not simple mixture of sulfur and selenium, and the alloying process between S and Se can results in an amorphous region, primarily resulting from the interaction between S and Se at the atomic level. This series of materials was further investigated using a pair of distribution function (PDF) measurements, carried out at sector 12-ID-B of the Advanced Photon Sources (APS) at Argonne National Laboratory. FIG. 1C shows the PDF profiles within the radial distance between 1.5 Å and 3.0 Å. The intensity of the PDF peak depicts the probability of finding a pair of atoms in the material with a specific radial distance. FIG. 1C shows that the S—S bond length is about 2.067 Å, while the Se—Se length is about 2.368 Å. In the high S-content region (bottom part), the S—S length remains constant, and its intensity decreases with the addition of Se. However, in the high Se-content region (top part), the Se—Se distance decreases with the addition of S to Se.

Example 3. X-Ray Diffraction Pattern of $S_xSe_y$/Carbon Composites

Figure 2:
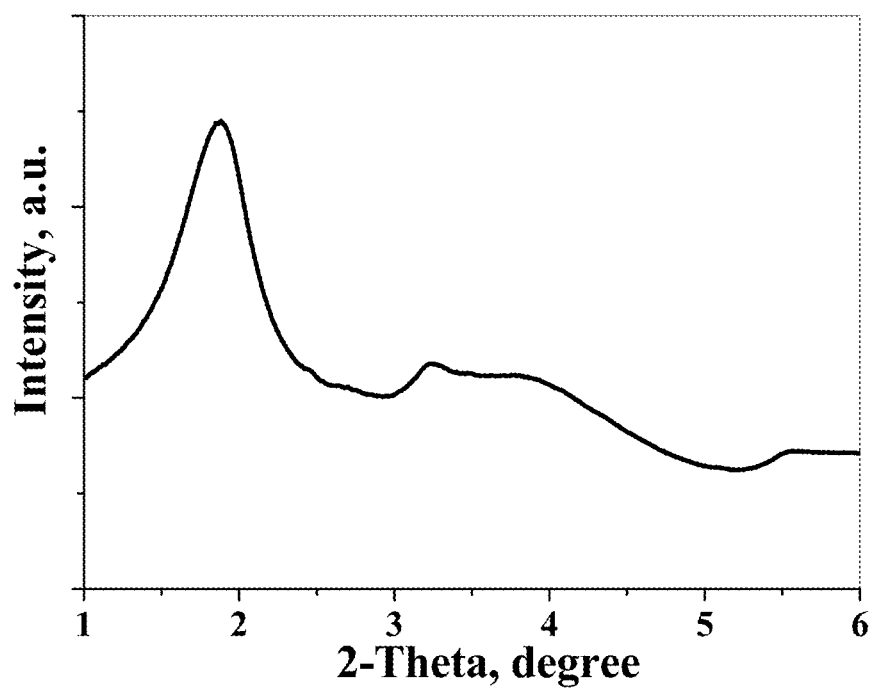
FIG. 2 is a X-ray diffraction pattern of an $S_xSe_y$/carbon composite, according to the examples.

FIG. 2 shows the typical XRD pattern of $S_xSe_y$/carbon composite. As shown, no crystalline peaks could be observed after high temperature treatment on the mixture of sulfur, selenium and carbon matrix, indicating that $S_xSe_y$ may exist in an amorphous state and uniformly dispersed on the surface or within pores of the carbon matrix. This structure exhibits good electrochemical performance due to the confinement of the carbon matrix for polysulfides and polyselenides.

Example 4. TGA Curve of $S_xSe_y$/Carbon Composites

Figure 3:
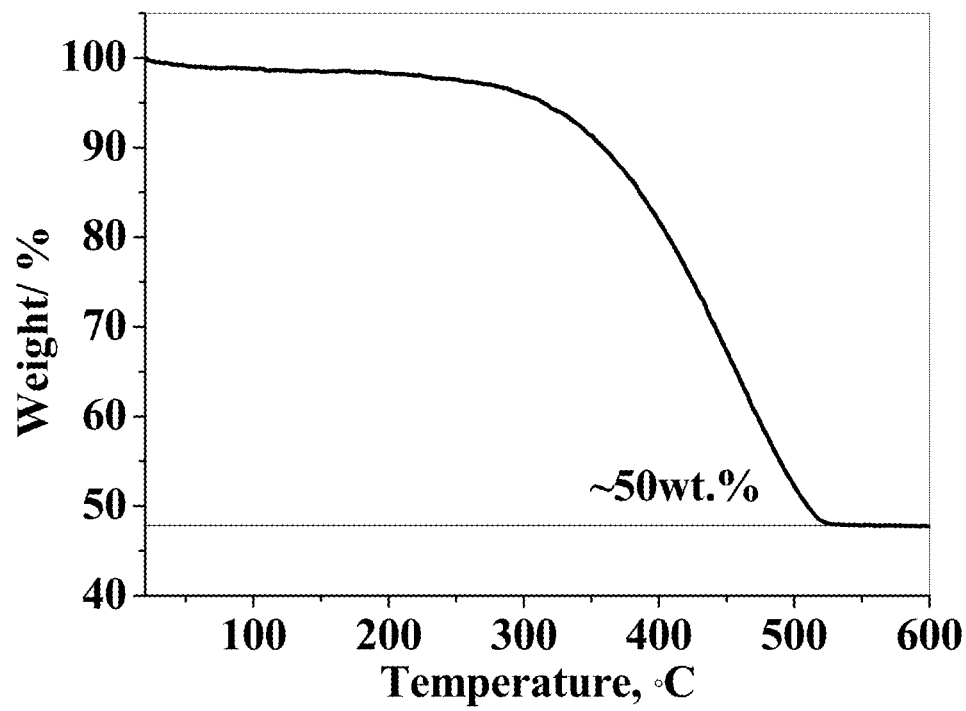
FIG. 3 is a thermal gravimetric analysis ("TGA") curve of a $S_xSe_y$/carbon composite from room temperature to 600° C. under argon atmosphere, according to the examples.

FIG. 3 shows the TGA curve of a typical $S_xSe_y$/carbon composite with a designed $S_xSe_y$ content of 50 wt % from room temperature to 600° C. under an argon atmosphere. As shown, the material exhibits very little weight loss under 300° C. However, between 300° C. and 500° C., a large weight loss was observed (about 50 wt %). This is consistent with the designed weight ratio, indicating that selenium and sulfur were alloyed to the designed $S_xSe_y$ and well-dispersed within the carbon matrix.

Example 5. Typical Microstructure and Morphology of a $S_xSe_y$/Carbon Composite The microstructure and morphology of a typical $S_xSe_y$/carbon composite were examined with scanning electron microscopy ("SEM") and transmission electron microscopy ("TEM"). The elemental distribution for selenium, sulfur and carbon was characterized by EDX elemental mapping. The composition of the $S_xSe_y$/carbon composite was also determined with an energy dispersive spectrometer ("EDS") attached to the TEM instrument.

The microstructures of a typical $S_xSe_y$/carbon composite were observed using SEM. The SEM images illustrate that the $S_xSe_y$/carbon material has a particle size of several micrometers, which is composed of a lot of primary, nano-sized particles.

In order to ascertain the distribution of selenium, sulfur and carbon in the $S_xSe_y$/carbon composite, SEM elemental mapping was conducted (not shown). The mapping illustrated that the carbon, selenium and sulfur were found all over the sample indicating a uniform mixing of the materials and ensuring a high electronic conductivity of the composite. The mapping showed that there is no aggregation of the sulfur or selenium, further confirming that the materials have alloyed to form a new $S_xSe_y$ phase.

A low magnification TEM image (not shown) was obtained for a $S_xSe_y$/carbon composite, and it showed particle sizes greater than 1 μm, and that the particle surface is fairly rough. A high magnification TEM image of the $S_xSe_y$/carbon composite (not shown) was found to illustrate many small black dots with a size of about 1 to about 2 nm and graphite lattices, but no lattice related to $Se_2S_5$ was found, indicating that $S_xSe_y$ is in an amorphous state. This is further confirmed by the selected area electron diffraction pattern analysis (not shown), which exhibited only graphite diffraction rings of carbon matrix. The TEM elemental mapping images further confirmed the uniform distribution of sulfur, selenium and carbon in the $S_xSe_y$/carbon composite. The TEM mapping indicated that the $S_xSe_y$ is in an amorphous state and well embedded into the pores or surface of carbon matrix.

Example 6. Battery with a $S_xSe_y$/Carbon Composite as the Cathode and with a Fluorinated Electrolyte The $S_xSe_y$/carbon composite was mixed with 20 wt % of Super-P and 10 wt % of sodium cellulose (2 wt % in water) binder. The well-mixed slurry was then cast onto a sheet of aluminum foil by a doctor blade on an automatic film coater. The film was dried in a vacuum oven at 60° C. for 24 h and transferred to an argon-filled glove box, prior to being punched out as 14 mm diameter circular disks. The electrolyte included 1.0 M LiTFSI salt in a dioxolane ("DOL")/HFE (1/1, v/v) solution with 0.1 M LiNO$_3$. A CR2032 coin cell was then assembled using the prepared electrode disk, the prepared electrolyte, a lithium foil counter electrode, and a glass fiber separator. Cell assembly was conducted in an argon-filled glove box. In this example, the Se content is about 50 wt %.

Example 7. Battery with $S_xSe_y$/Carbon Composite Cathode and without a Fluorinated Electrolyte An electrochemical cell was prepared in the same manner as Example 6, except for the replacement of the electrolyte with 1.0 M LiTFSI salt in a DOL/DME (1/1, v/v) solution with 0.1 M LiNO$_3$ as an additive.

Example 8. Battery with Se/Carbon Composite Cathode

An electrochemical cell was prepared in the same manner as Example 6, except for the cathode was using a Se/carbon composite.

Example 9. Battery with a Sulfur-Rich $S_xSe_y$/Carbon Composite Cathode

An electrochemical cell was prepared in the same manner as Example 6, except for the cathode was using a S-rich $S_xSe_y$/carbon composite. In this example, the Se content is about 10 wt %.

Example 10. Battery with S/Carbon Composite Cathode

An electrochemical cell was prepared in the same manner as Example 6, except for the cathode was using a S/carbon composite.

Example 11. Cyclic Voltammograms of the Battery of Examples 6 and 7

Figure 4A:
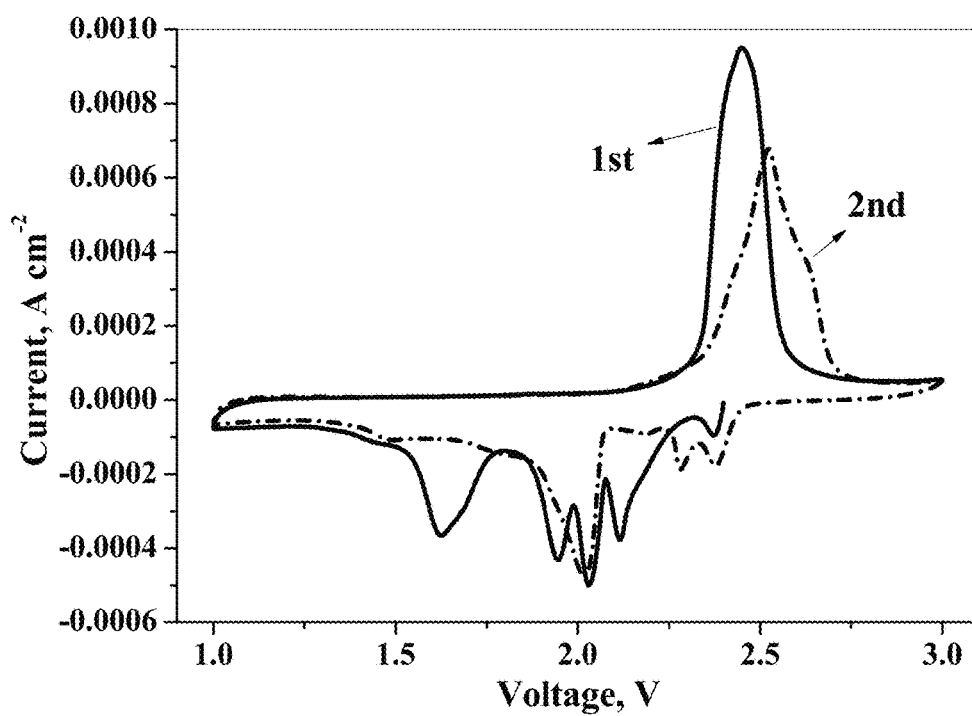
FIGS. 4A and 4B depict representative cyclic voltammograms of electrochemical cells containing $S_xSe_y$/carbon cathodes according to (A) Example 7 and (B) Example 6.
Figure 4B:
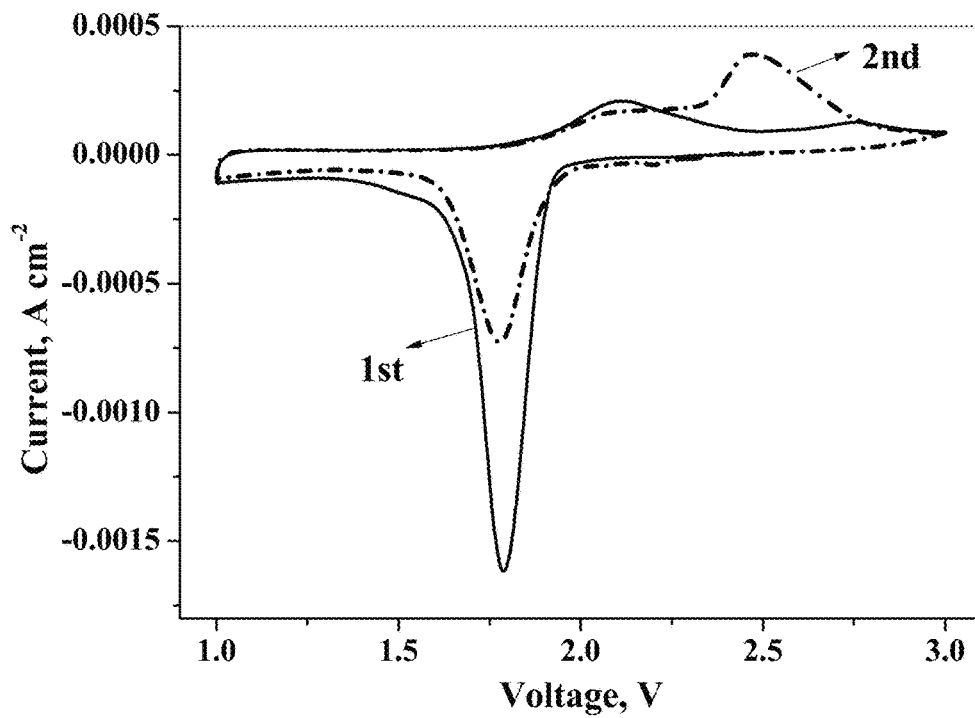

In order to examine the lithiation/de-lithiation process of the $S_8Se_y$/carbon composite cathode material, cyclic voltammetry ("CV") was performed at a scan rate of 0.1 mV s$^{-1}$ within a voltage range of 1.0 to 3.0 V with the electrochemical cells of Examples 6 and 7. As shown in FIG. 4A, multi reduction peaks can be observed in DOL/DME-based electrolytes, which corresponds to the two-step transformation from S (Se) to $Li_2S_n$ ($Li_2Se_n$) and further $Li_2S$ ($Li_2Se$). While in a DOL/HFE-based electrolyte, only a broad reduction peak can be observed, indicating a different reaction pathway. The single reduction peak in the CV (FIG. 4B) is commonly considered as a one-step reaction ($S_8$ to $Li_2S$ or $Se_8$ to $Li_2Se$). The distinctive electrochemical characteristic will lead to different electrochemical performance. It can be inferred that DOL/HFE-based electrolytes may benefit its reversible capacity, coulombic efficiency and capacity retention owing to the absence of soluble polyselenides and polysulfides intermediate during charge/discharge process.

Example 12. In Operando $^7$Li Nuclear Magnetic Resonance (NMR) Spectra of a Battery Using a $S_8Se_y$/Carbon Composite Cathode In order to further confirm the absence of soluble polyselenides and polysulfides during the charge/discharge process of Example 6, in operando NMR was used to track its structure evolution during the lithiation/de-lithiation process. FIGS. 5A, 5B, and 5C show the NMR spectra of the pristine cell (A), 1$^{st}$ discharge cell (B; 1.0 V) and 1$^{st}$ charge cell (C, 3.0 V), respectively. As shown, the pristine spectrum exhibits two sharp peaks and a very weak broad peak, which gradually increased during the lithiation and decreased during the de-lithiation process. The sharp peaks were generally related to the dissolved phases and the broad peak was attributed to the solid phase during the electrochemical reaction process. FIG. 5D shows the contour plot of the NMR spectra during the 1$^{st}$ cycle, which indicates that the broad weak was gradually increased during the discharge process and decreased during the charge process, while the sharp peaks exhibit very little change during the whole 1$^{st}$ cycle. By using the software to fit the NMR spectra, the composition change of these phases during charge/discharge process may be modeled. As shown in FIG. 5E, the soluble phases have very little increase and then remain relatively stable, while the solid phase gradually increases during the discharge process, and then gradually decreases during the charge process. This means that the DOL/HFE-based electrolytes indeed decrease the formation of the soluble polyselenides and polysulfides, leading to improved electrochemical performance.

Figure 6:
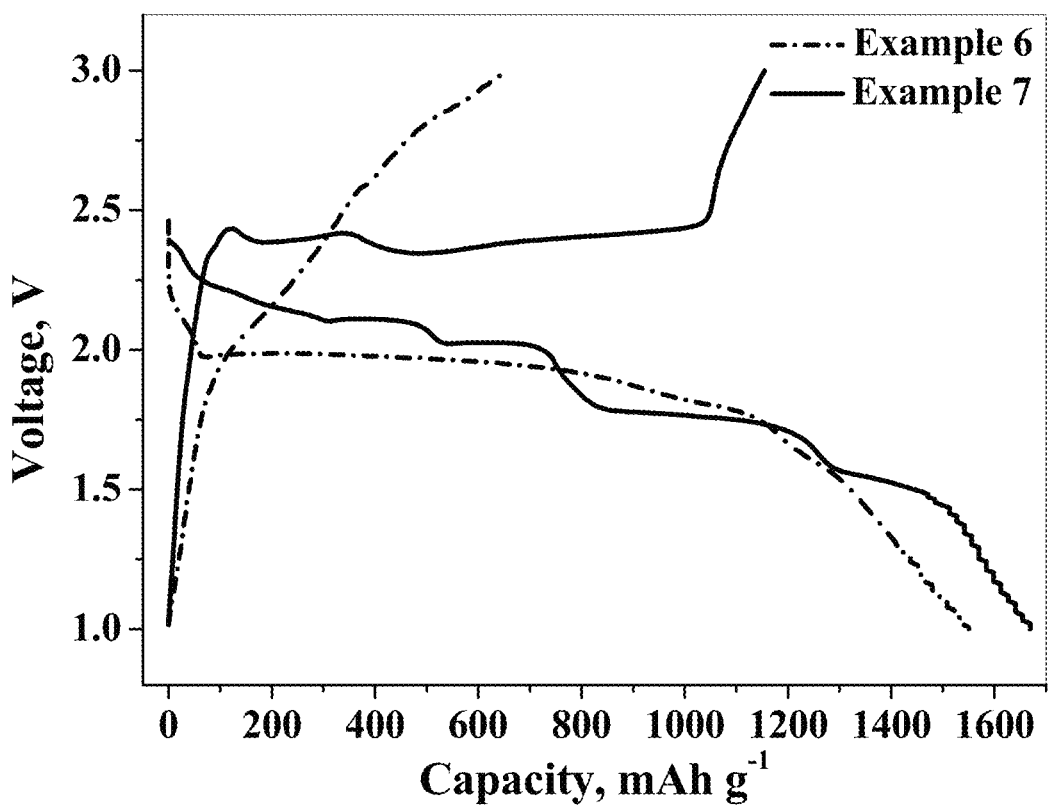
FIG. 6 depicts a representative charge/discharge curve of $S_xSe_y$/carbon cathodes, according to Examples 6 and 7 at 70 mA g$^{-1}$.

Example 13. Electrochemical Performance of Batteries Having $S_xSe_y$/Carbon Composite Cathodes The electrochemical cells of Examples 6 and 7 were both discharged/charged at about 70 mA g$^{-1}$. FIG. 6 shows the 1$^{st}$ discharge/charge curve of Examples 6 and 7, which presented a significantly different voltage profiles. As shown, in the DOL/HFE-based electrolytes, only one long discharge plateau can be observed, which is in good agreement with the results in CV and corresponds to the one-step transformation of $S_8$ ($Se_8$) to $Li_2S$ ($Li_2Se$). On the contrary, multiple discharge plateaus corresponding to the well-known, two-step transformation of $S_8$ ($Se_8$) to $Li_2S$ ($Li_2Se$) can be clearly seen. In the 1st charge process it can be seen that a polarization was observed in the DOL/HFE-based electrolytes, which may be due to solid phase electrochemical reaction.

Figure 7:
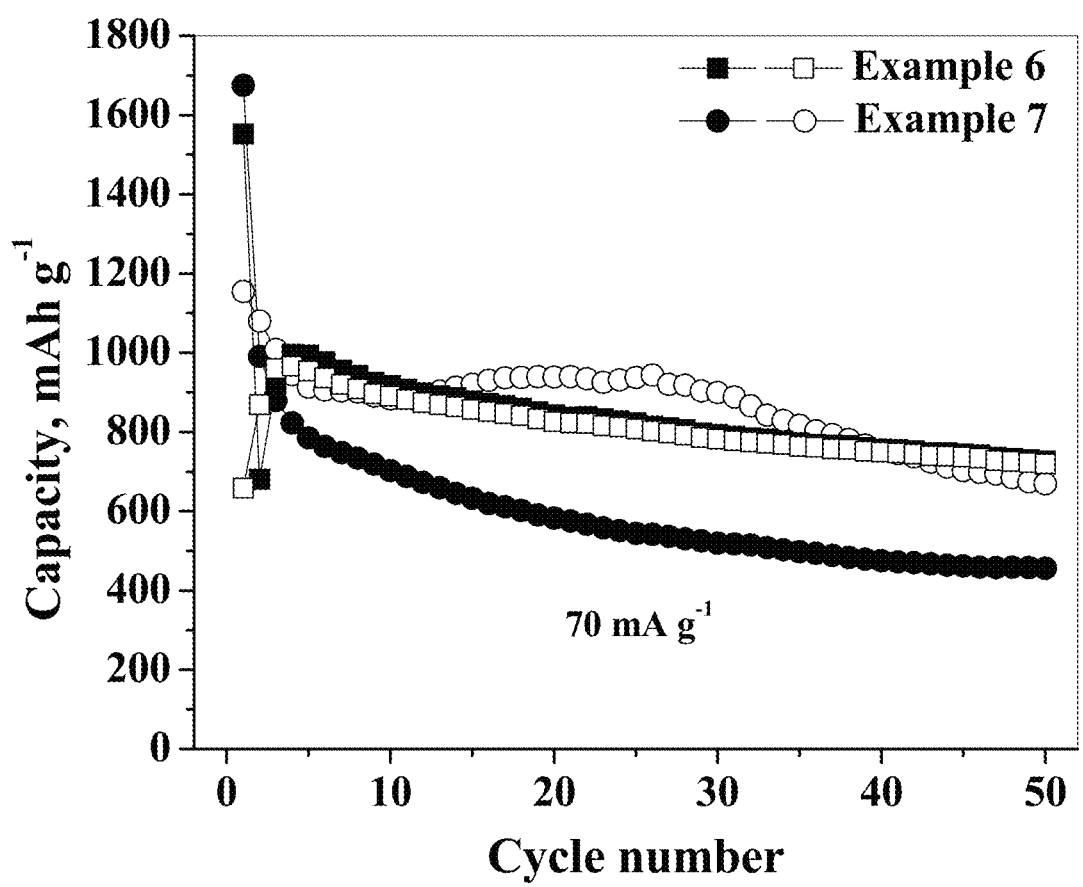
FIG. 7 depicts representative cycle performance of the electrochemical cells, according to Examples 6 and 7 at 70 mA g$^{-1}$.

FIG. 7 compares the cycle performance of Example 6 to Example 7. As shown, although the $S_xSe_y$/carbon cathode delivered higher initial discharge capacities, a continuous capacity fading together with a severe overcharge phenomenon can be clearly observed in the DOL/DME-based electrolytes (Example 7). In the DOL/HFE-based electrolytes (Example 6), after three cycles of activation, the $S_xSe_y$/carbon cathode demonstrated much better cycle performance. After 50 cycles of charge/discharge, it can still maintain a reversible capacity of 720.5 mAh g$^{-1}$ with very little shuttle effect. This may be due to the different reaction pathways, as discussed above.

Figure 8:
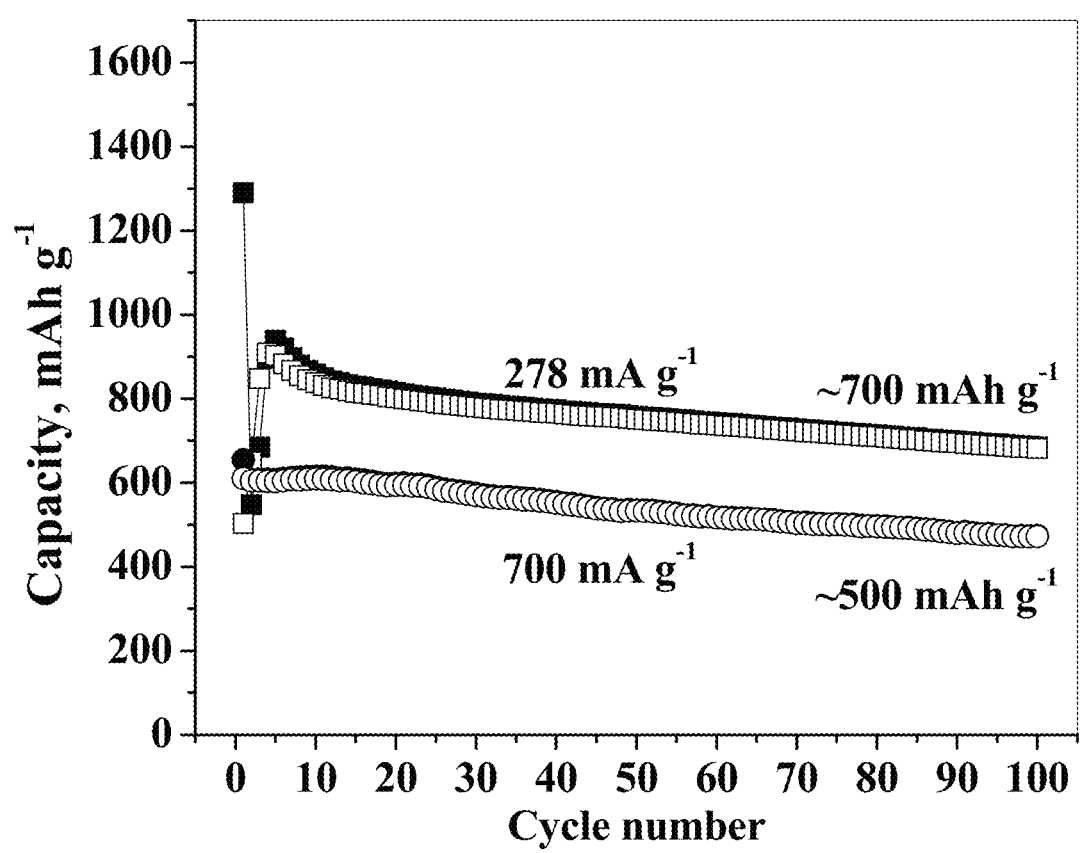
FIG. 8 depicts representative cycle performance of the electrochemical cells, according to Example 6, at 278 mA g$^{-1}$ and 700 mA g$^{-1}$.

FIG. 8 shows the cycle performance of Example 6 at different current density. As shown, at higher charge/discharge current densities, the $S_xSe_y$/carbon cathode could also demonstrate very high reversible capacities and good cycle stability with high coulombic efficiency. It could still maintain a reversible capacity of around 700 mAh g$^{-1}$ at 278 mA g$^{-1}$ and 500 mAh g$^{-1}$ at 700 mA g$^{-1}$ after 100 cycles of charge/discharge.

Figure 9:
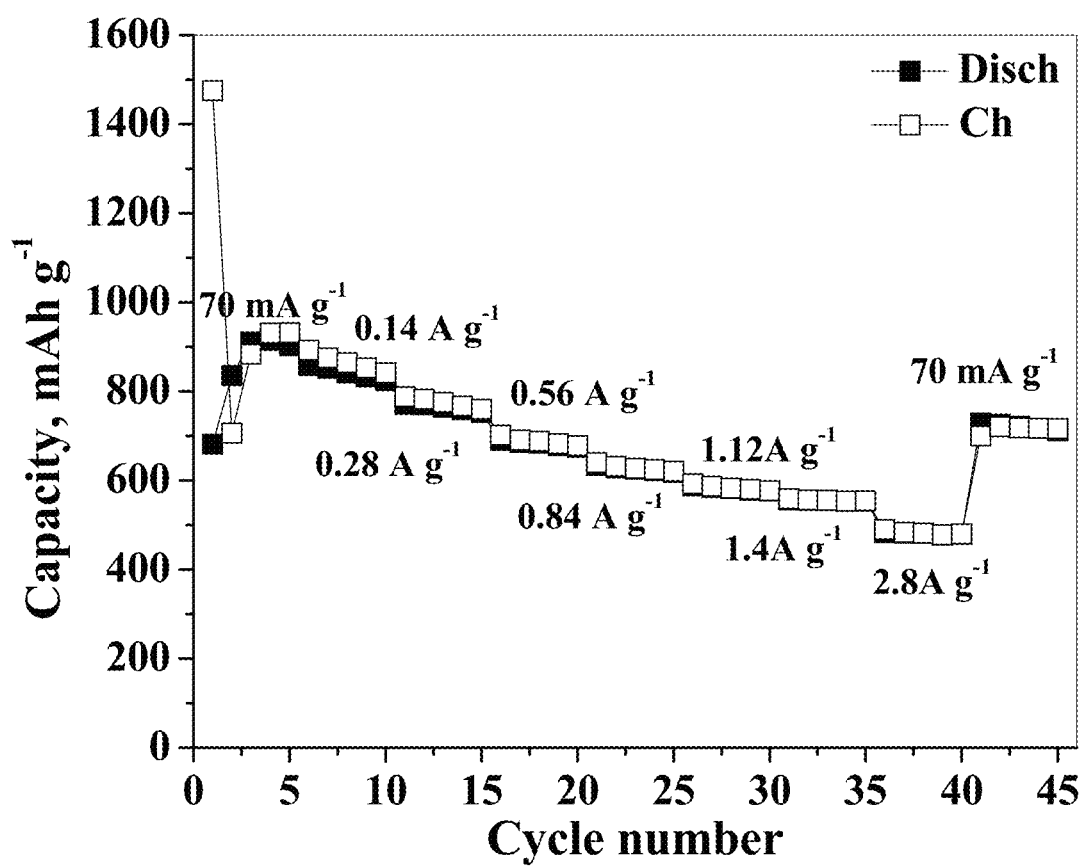
FIG. 9 depicts representative rate performance of the electrochemical cell, according to Example 6.

FIG. 9 shows the rate performance of Example 6. The charge/discharge current densities were successively increased from 70 mA g$^{-1}$, 0.14 A g$^{-1}$, 0.28 A g$^{-1}$, 0.56 A g$^{-1}$, 0.84 A g$^{-1}$, 1.12 A g$^{-1}$, 1.4 A g$^{-1}$ to 2.8 A g$^{-1}$, and then decreased back to 70 mA g$^{-1}$ again. As shown, the reversible capacity was gradually decreased along with increasing the rate. However, at a high rate of 2.8 A g$^{-1}$, it can still deliver a capacity of about 480 mAh g$^{-1}$. When the rate was decreased to 70 mA g$^{-1}$, an average capacity of about 720 mAh g$^{-1}$ could be recovered, indicating excellent rate capability.

Figure 10:
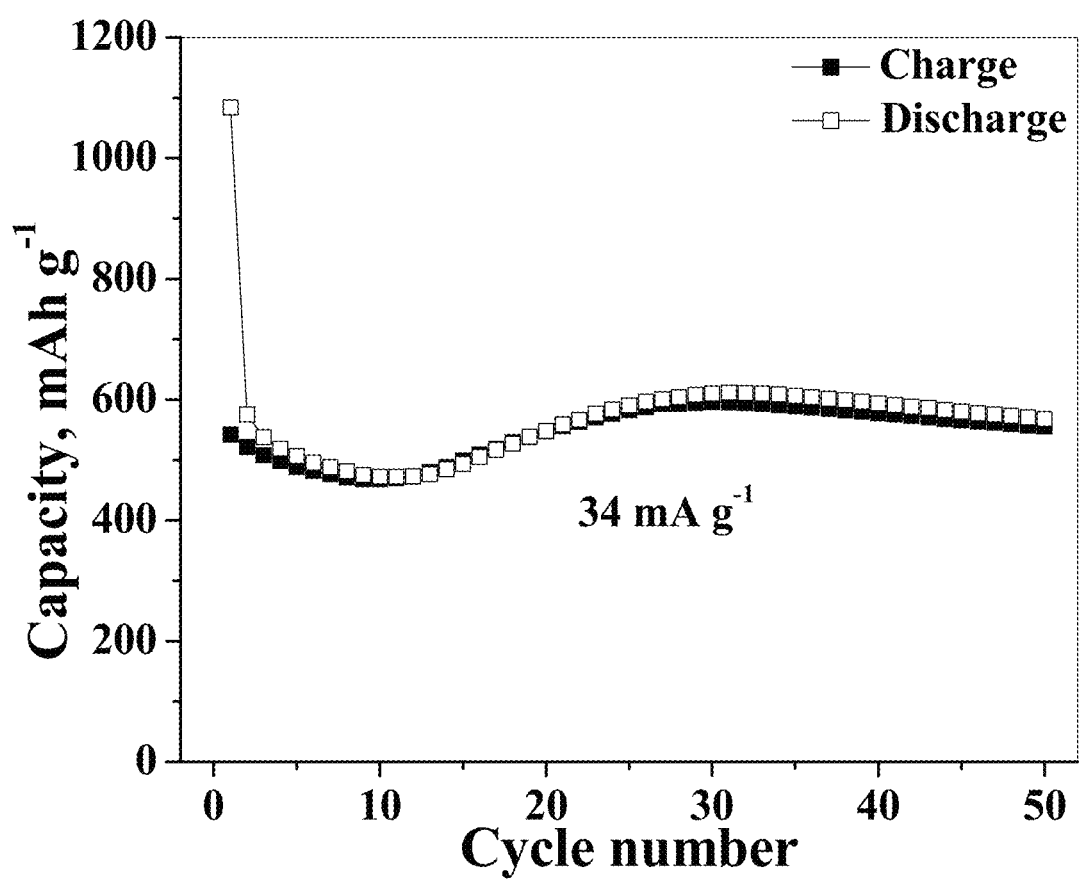
FIG. 10 depicts representative cycle performance of the electrochemical cell of Example 8 at 34 mA g$^{-1}$.

In the DOL/HFE-based electrolytes, it can be seen that there is an activation process for $S_xSe_y$/carbon composites during the initial charge/discharge. As shown in FIG. 10, the capacity was gradually increased for the Se/carbon cathode (Example 8).

Figure 11:
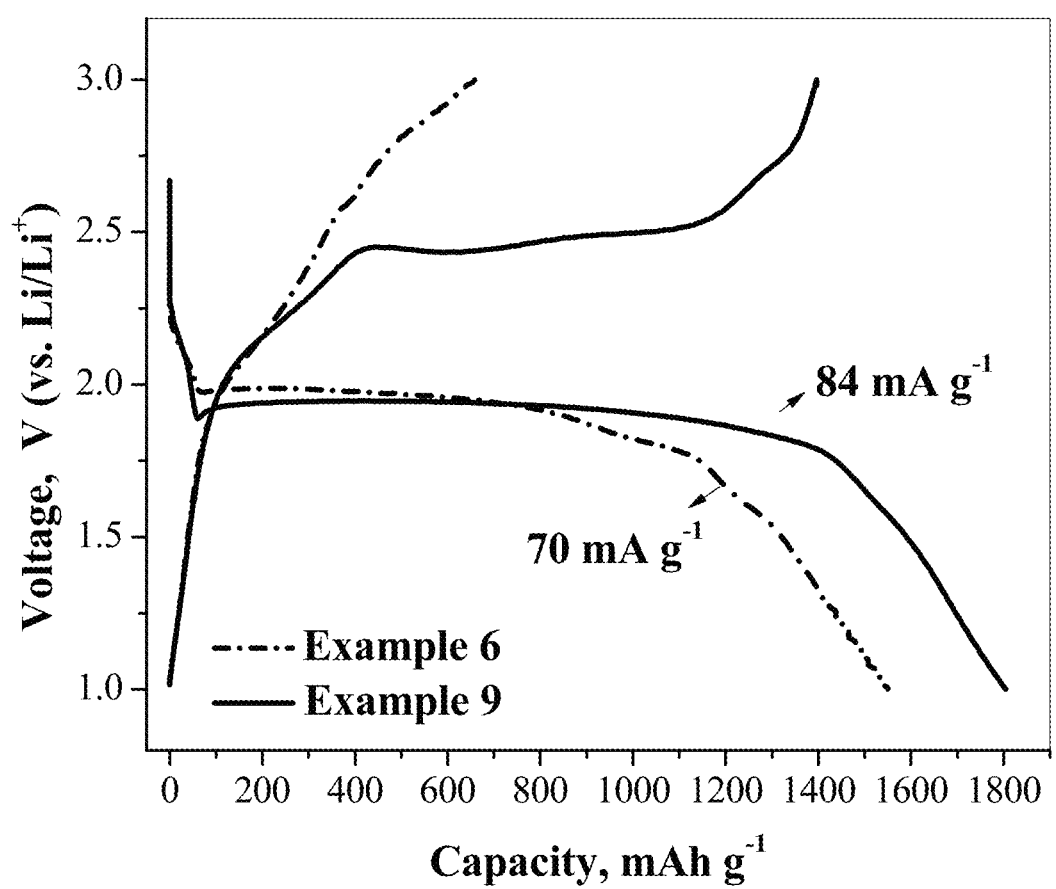
FIG. 11 depicts representative charge/discharge curve of the electrochemical cell of Example 9 and Example 6.

FIG. 11 compares the 1$^{st}$ charge/discharge curves of Example 9 to Example 6. As shown, the polarization during the charge process was significantly decreased and the 1st reversible capacity was greatly increased. The S-rich $S_xSe_y$/carbon composite (Ex. 9) could deliver an initial charge capacity of 1396.5 mAh g$^{-1}$ at a current density of 84 mA g$^{-1}$, indicating a high utilization of active material in the DOL/DME-based electrolytes.

Figure 12:
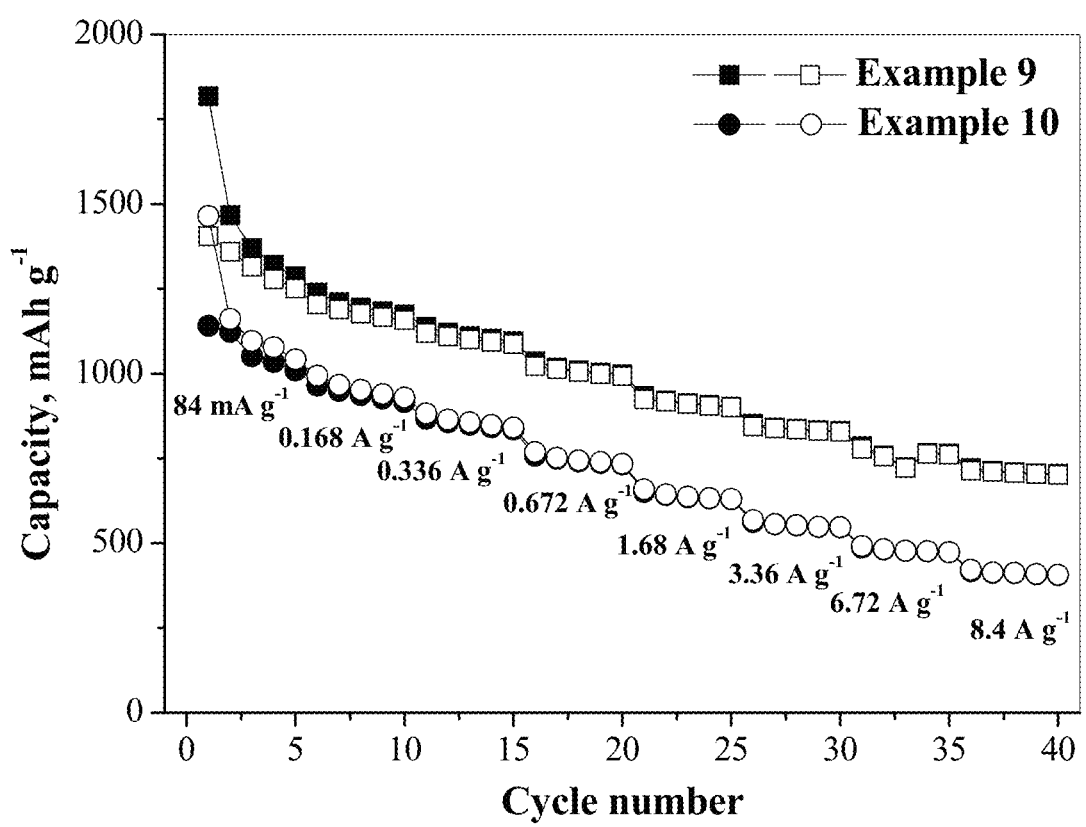
FIG. 12 depicts representative rate performance of the electrochemical cell of Example 9 and Example 10.

FIG. 12 compares the rate capabilities of an S-rich $S_xSe_y$/carbon composite (Example 9) to a S/carbon composite (Example 10). The charge/discharge current densities were successively increased from 84 mA g$^{-1}$, 0.168 A g$^{-1}$, 0.336 A g$^{-1}$, 0.672 A g$^{-1}$, 1.68 A g$^{-1}$, 3.36 A g$^{-1}$, 6.72 A g$^{-1}$ to 8.4 A g$^{-1}$. As can be seen, the S-rich $S_xSe_y$/carbon composite demonstrated much higher reversible capacities at various charge/discharge densities, which may be due to the higher electronic conductivity of Se than sulfur. At an extremely high charge/discharge current density of 8.4 A g$^{-1}$, the S-rich $S_xSe_y$/carbon composite could still maintain a reversible capacity of around 710 mAh g$^{-1}$, indicating superior rate capability.

Figure 13:
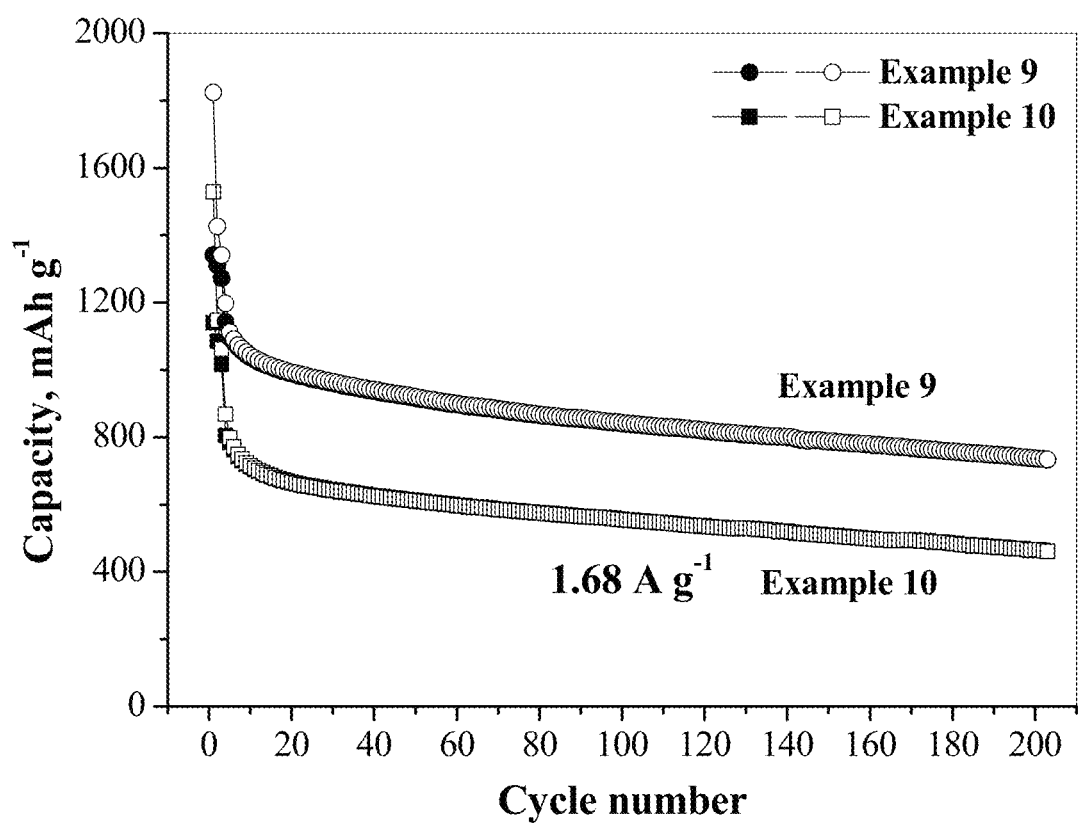
FIG. 13 depicts representative cycle performance of the electrochemical cell of Example 9 and Example 10 at 1.68 A g$^{-1}$.

FIG. 13 further compares the cycle stability of the S-rich $S_xSe_y$/carbon composite (Example 9) and S/carbon composite (Example 10) at high rate charge/discharge. After cycling at 84 mA g$^{-1}$ for 3 cycles, the cells were charge/discharged at 1.68 A g$^{-1}$. As shown, after 200 cycles of charge/discharge, the S-rich $S_xSe_y$/carbon cathode could still maintain a high reversible capacity as high as 734.5 mAh g$^{-1}$, while only 461 mAh g$^{-1}$ for S/carbon cathode. This may be also due to the addition of Se in the S/carbon system, which can significantly increase the electronic conductivity of the $S_xSe_y$/carbon composite.

Figure 14:
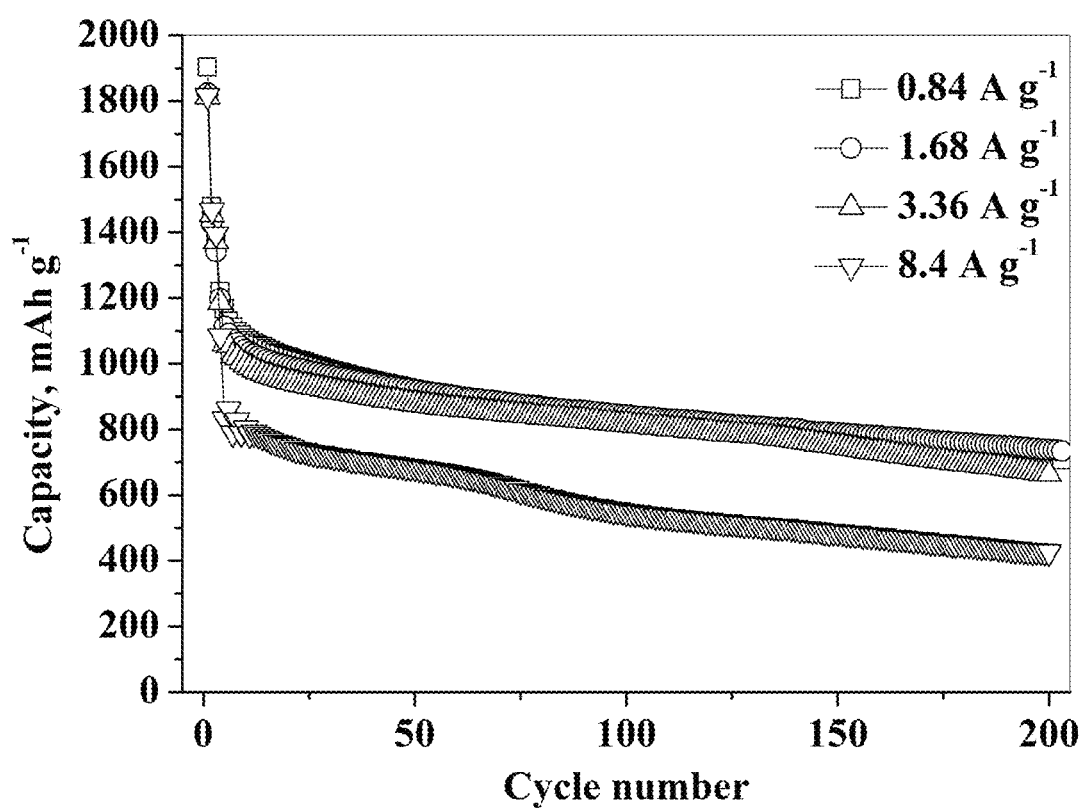
FIG. 14 depicts representative rate performance of the electrochemical cell of Example 9 at different current densities.

FIG. 14 shows the cycle performance of the S-rich $S_xSe_y$/carbon cathode (Example 9) at different rates. As can be seen, the S-rich $S_xSe_y$/carbon cathode demonstrates similar electrochemical performance at current densities of 0.84 A g$^{-1}$, 1.68 A g$^{-1}$ and 3.36 A g$^{-1}$. After 200 cycles of charge/discharge, while the reversible capacities were all maintained at around 700 mAh g$^{-1}$. At an extremely high current density of 8.4 A g$^{-1}$, the S-rich $S_xSe_y$/carbon cathode could still deliver a reversible capacity over 400 mAh g$^{-1}$ after 200 cycles.

Therefore, a lithium battery including a $S_xSe_y$/carbon cathode and a fluorinated ether-based electrolyte has been shown to deliver a very high reversible capacity together with excellent cycle stability and superior rate capability.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical device comprising:
    a cathode comprising a selenium-doped sulfur ($S_xSe_y$)/carbon composite;
    a lithium anode or a sodium anode;
    a separator; and
    an electrolyte comprising:
        a salt; and
        a non-aqueous, fluorinated ether solvent selected from the group consisting of 1,1,2,2-tetrafluoroethyl-2,2,3,3,3-pentafluoropropyl ether; 1,1,2,2-tetrafluoroethyl-2,2,3,3-tetrafluoropropyl ether; 2,2,2-trisfluoroethyl-1,1,2,3,3,3-hexafluoropropyl ether; 1,1,1,3,3,3-hexafluoro-2-propyl ether; ethyl-1,1,2,3,3,3-hexafluoropropyl ether; difluoromethyl-2,2,3,3,3-pentafluoropropyl ether; and difluoromethyl-2,2,3,3-tetrafluoropropyl ether;
    wherein:
        the salt is present in the non-aqueous, fluorinated ether solvent at a concentration from about 0.01 M to about 2.0 M;
        the selenium-doped sulfur ($S_xSe_y$)/carbon composite comprises:
            a conductive carbon matrix; and
            nano-sized selenium-doped sulfur particles;
        a ratio of x:y is from 2.5 to 1000.

2. The electrochemical device of claim 1, wherein:
    the nano-sized selenium-doped sulfur particles are uniformly dispersed on the surface of the conductive carbon matrix; and
    the conductive carbon matrix comprises graphite, graphene, expanded graphite, reduced graphene oxide, acetylene black, carbon black, a metal-organic framework, porous carbon, carbon spheres, or carbon aerogel, single-walled carbon nanotubes, multi-walled carbon nanotubes, carbon nanofibers, carbon nanotube arrays, polypyrrole, or polyaniline.

3. The electrochemical device of claim 1, wherein:
    the conductive carbon matrix is a porous conductive carbon matrix;
    the nano-sized selenium-doped sulfur particles are uniformly within pores of the porous conductive carbon matrix; and
    the conductive carbon matrix comprises graphite, graphene, expanded graphite, reduced graphene oxide, acetylene black, carbon black, a metal-organic framework, porous carbon, carbon spheres, or carbon aerogel, single-walled carbon nanotubes, multi-walled carbon nanotubes, carbon nanofibers, carbon nanotube arrays, polypyrrole, or polyaniline.

4. The electrochemical device of claim 1, wherein the non-aqueous fluorinated ether solvent is 1,1,2,2-tetrafluoroethyl-2,2,3,3-tetrafluoropropyl ether.

5. The electrochemical device of claim 1, wherein the electrolyte further comprises a non-fluorinated co-solvent.

6. The electrochemical device of claim 1 that is a lithium battery.

7. The electrochemical device of claim 1 that is a sodium battery.

8. The electrochemical device of claim 1, wherein the salt is present in the non-aqueous, fluorinated ether solvent at a concentration from about 0.01 M to about 1.5 M.

9. The electrochemical device of claim 1, wherein the salt is present in the non-aqueous, fluorinated ether solvent at a concentration from about 0.01 M to about 1.0 M.

* * * * *